United States Patent
Kutz et al.

(10) Patent No.: US 11,711,186 B2
(45) Date of Patent: Jul. 25, 2023

(54) ENHANCED DEMODULATION REFERENCE SIGNAL FOR DIGITAL POST DISTORTION ASSIST

(71) Applicant: QUALCOMM Incorporated, San Diego, CA (US)

(72) Inventors: Gideon Shlomo Kutz, Ramat Hasharon (IL); Assaf Touboul, Netanya (IL); Ronen Shaked, Kfar Saba (IL); Elad Meir, Ramat Gan (IL); Amit Bar-Or Tillinger, Tel-Aviv (IL); Yaniv Eistein, Tel Aviv (IL); Michael Levitsky, Rehovot (IL); Shay Landis, Hod Hasharon (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/319,388

(22) Filed: May 13, 2021

(65) Prior Publication Data

US 2022/0368483 A1 Nov. 17, 2022

(51) Int. Cl.
*H04L 5/00* (2006.01)
*H04L 27/18* (2006.01)

(52) U.S. Cl.
CPC ............ *H04L 5/0048* (2013.01); *H04L 27/18* (2013.01)

(58) Field of Classification Search
CPC .............................. H04L 5/0048; H04L 27/18
See application file for complete search history.

(56) References Cited

U.S. PATENT DOCUMENTS

| | | | | |
|---|---|---|---|---|
| 10,951,377 | B2 * | 3/2021 | Yi | H04L 5/001 |
| 11,018,910 | B2 * | 5/2021 | Liao | H04L 27/14 |
| 11,147,051 | B2 * | 10/2021 | Kwak | H04L 5/0094 |
| 11,190,321 | B2 * | 11/2021 | Wu | H04L 5/0051 |
| 2013/0195051 | A1 | 8/2013 | Koivisto et al. | |
| 2019/0190552 | A1 | 6/2019 | Sagi et al. | |
| 2021/0409182 | A1 * | 12/2021 | Lee | H04L 1/1864 |

FOREIGN PATENT DOCUMENTS

WO WO-2020076656 A1 4/2020

OTHER PUBLICATIONS

International Search Report and Written Opinion—PCT/US2022/027490—ISA/EPO—dated Jul. 6, 2022.

* cited by examiner

*Primary Examiner* — Chandrahas B Patel
(74) *Attorney, Agent, or Firm* — Holland & Hart LLP

(57) ABSTRACT

Methods, systems, and devices for wireless communications are described. A first wireless device may identify a set of data resource elements for transmitting data in one or more symbols periods. The first wireless device may generate, for the one or more symbol periods based on the set of data resource elements, a sequence of a set of pilot resource elements associated with the set of data resource elements, the sequence of the set of pilot resource elements including a demodulation reference signal. The first wireless device may transmit, to a second wireless device in the one or more symbol periods, the set of data resource elements and the set of pilot resource elements. The second wireless device may decode a first subset of the set of pilot resource elements based on a second subset of the set of pilot resource elements to determine the demodulation reference signal.

28 Claims, 16 Drawing Sheets

ENHANCED DEMODULATION REFERENCE SIGNAL FOR DIGITAL POST DISTORTION ASSIST

FIELD OF TECHNOLOGY

The following relates to wireless communications, including enhanced demodulation reference signal for digital post distortion assist.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support enhanced demodulation reference signal for digital post distortion assist. Generally, the described techniques provide for a first wireless device (e.g., a base station or user equipment (UE)) to adjust (e.g., minimize or reduce to satisfy a threshold) a peak to average power ratio associated with a set of resource elements (e.g., a set of resource elements within a symbol period). For instance, the first wireless device may identify a set of constellation points that may be mapped to a resource element or to a set of resource elements that include a demodulation reference signal. The first wireless device may determine a 1%-tile peak value associated with each constellation point of the set of constellation points and may select a constellation point from the set whose 1%-tile peak value satisfies (e.g., is below, above) a threshold or has the lowest or highest 1%-tile peak value. The first wireless device may determine a sequence for a demodulation reference signal based on the selected constellation point and may transmit the demodulation reference signal to a second wireless device based on the determined sequence.

A method for wireless communication at a first wireless device is described. The method may include identifying a set of data resource elements for transmitting data in one or more symbol periods, generating, for the one or more symbol periods based on the set of data resource elements, a sequence of a set of pilot resource elements associated with the set of data resource elements, the sequence of the set of pilot resource elements including a demodulation reference signal, and transmitting, to a second wireless device in the one or more symbol periods, the set of data resource elements and the set of pilot resource elements associated with the set of data resource elements.

An apparatus for wireless communication at a first wireless device is described. The apparatus may include a processor, memory coupled with the processor, and instructions stored in the memory. The instructions may be executable by the processor to cause the apparatus to identify a set of data resource elements for transmitting data in one or more symbol periods, generating, for the one or more symbol periods base at least in part on the set of data resource elements, a sequence of a set of pilot resource elements associated with the set of data resource elements, the sequence of the set of pilot resource elements including a demodulation reference signal, and transmit, to a second wireless device in the one or more symbol periods, the set of data resource elements and the set of pilot resource elements associated with the set of data resource elements.

Another apparatus for wireless communication at a first wireless device is described. The apparatus may include means for identifying a set of data resource elements for transmitting data in one or more symbol periods, means for generating, for the one or more symbol periods based on the set of data resource elements, a sequence of a set of pilot resource elements associated with the set of data resource elements, the sequence of the set of pilot resource elements including a demodulation reference signal, and means for transmitting, to a second wireless device in the one or more symbol periods, the set of data resource elements and the set of pilot resource elements associated with the set of data resource elements.

A non-transitory computer-readable medium storing code for wireless communication at a first wireless device is described. The code may include instructions executable by a processor to identify a set of data resource elements for transmitting data in one or more symbol periods, generating, for the one or more symbol periods base at least in part on the set of data resource elements, a sequence of a set of pilot resource elements associated with the set of data resource elements, the sequence of the set of pilot resource elements including a demodulation reference signal, and transmit, to a second wireless device in the one or more symbol periods, the set of data resource elements and the set of pilot resource elements associated with the set of data resource elements.

Some examples of the method, apparatuses, and non-transitory computer-readable medium described herein may further include operations, features, means, or instructions for transmitting, to the second wireless device, an indication of a first subset of the set of pilot resource elements, where the first subset of the set of pilot resource elements excludes at least one pilot resource element of the set of pilot resource elements, and where transmitting the set of pilot resource elements may be based on transmitting the indication of the first subset of the set of pilot resource elements.

In some examples of the method, apparatuses, and non-transitory computer-readable medium described herein, the transmitting of the indication of the first subset of the set of pilot resource elements may include operations, features, means, or instructions for transmitting configuration signaling identifying the first subset of the set of pilot resource elements.

In some examples of the method, apparatuses, and non-transitory computer-readable medium described herein, transmitting the configuration signaling identifying the first subset of the set of pilot resource elements may include operations, features, means, or instructions for transmitting a demodulation reference signal configuration identifying the first subset of the set of pilot resource elements.

Some examples of the method, apparatuses, and non-transitory computer-readable medium described herein may further include operations, features, means, or instructions for identifying a first subset of the set of pilot resource elements that excludes a second subset of the set of pilot resource elements, where transmitting the set of pilot resource elements may be based on identifying the first subset of the set of pilot resource elements.

In some examples of the method, apparatuses, and non-transitory computer-readable medium described herein, generating the sequence may include operations, features, means, or instructions for selecting the sequence from a set of sequences, where transmitting the set of pilot resource elements may be based on selecting the sequence from the set of sequences.

In some examples of the method, apparatuses, and non-transitory computer-readable medium described herein, the sequence may be selected from the set of sequences based on a metric for the sequence satisfying a threshold.

In some examples of the method, apparatuses, and non-transitory computer-readable medium described herein, the metric includes a percentile peak value and and satisfying the threshold includes the percentile peak value being above the threshold.

In some examples of the method, apparatuses, and non-transitory computer-readable medium described herein, each sequence of the set of candidate sequences may have an associated value of a metric and the sequence may be selected from the set of sequences based on the associated value of the metric of the sequence having a lowest value or a highest value relative to the value of the metric for each other sequence of the set of candidate sequences.

Some examples of the method, apparatuses, and non-transitory computer-readable medium described herein may further include operations, features, means, or instructions for modulating each pilot resource element of the set of pilot resource elements using quadrature phase shift keying, where transmitting the set of pilot resource elements may be based on the modulating.

Some examples of the method, apparatuses, and non-transitory computer-readable medium described herein may further include operations, features, means, or instructions for identifying a set of constellation points associated with a pilot resource element of the set of pilot resource elements, determining a value of a metric for the pilot resource element for each constellation point of the set of constellation points, and selecting, for the pilot resource element, a constellation point of the set of constellation points based on determining the value of the metric for each constellation point of the set of constellation points, where transmitting the set of pilot resource elements may be based on selecting the constellation point.

Some examples of the method, apparatuses, and non-transitory computer-readable medium described herein may further include operations, features, means, or instructions for identifying a second set of constellation points associated with a second pilot resource element of the set of pilot resource elements, determining a second value of the metric for the second pilot resource element for each constellation point of the second set of constellation points, and selecting, for the second pilot resource element, a second constellation point of the second set of constellation points based on determining the second value of the metric for each constellation point of the second set of constellation points, where transmitting the set of pilot resource elements may be based on selecting the second constellation point.

Some examples of the method, apparatuses, and non-transitory computer-readable medium described herein may further include operations, features, means, or instructions for identifying a first subset of the set of pilot resource elements that excludes a second subset of the set of pilot resource elements, where the second subset of the set of pilot resource elements includes the first pilot resource element and the second pilot resource element.

Some examples of the method, apparatuses, and non-transitory computer-readable medium described herein may further include operations, features, means, or instructions for selecting, for each pilot resource element of the second subset of the set of pilot resource elements, a respective constellation point of a respective set of constellation points based on determining a respective value of the metric for each constellation point of the respective set of constellation points, where transmitting the set of pilot resource elements may be based on selecting the respective constellation point for each pilot resource element of the second subset of the set of pilot resource elements.

Some examples of the method, apparatuses, and non-transitory computer-readable medium described herein may further include operations, features, means, or instructions for refraining from determining a respective value of the metric for each pilot resource element of the first subset of the set of pilot resource elements, where transmitting the set of pilot resource elements may be based on the refraining.

In some examples of the method, apparatuses, and non-transitory computer-readable medium described herein, selecting the constellation point may include operations, features, means, or instructions for determining, for each constellation point of the set of constellation points, a percentile peak value over a symbol period that overlaps in time with the first pilot resource element and selecting a first constellation point of the set of constellation points associated with a higher percentile peak value than that of a second constellation point of the set of constellation points.

In some examples of the method, apparatuses, and non-transitory computer-readable medium described herein, the first constellation point may be associated with a highest percentile peak of each constellation point in the set of constellation points.

Some examples of the method, apparatuses, and non-transitory computer-readable medium described herein may further include operations, features, means, or instructions for identifying a number of constellation points associated with performing quadrature amplitude modulation on a data resource element of the set of data resource elements, where generating the sequence may be based on the number of constellation points being above a threshold.

In some examples of the method, apparatuses, and non-transitory computer-readable medium described herein, generating the sequence may include operations, features, means, or instructions for identifying a set of constellation points for each pilot resource element of the set of pilot resource elements, generating a set of multiple sequences of constellation points, where each sequence of constellation points includes one constellation point from each set of constellation points for the set of pilot resource elements, determining, for each sequence of constellation points of the plurality, a value of a metric, and selecting, for the set of pilot resource elements, a sequence of constellation points from the plurality based on determining the value of the metric for each constellation point of the set of constellation points, where transmitting the set of pilot resource elements may be based on selecting the sequence of constellation points.

In some examples of the method, apparatuses, and non-transitory computer-readable medium described herein, the metric includes a percentile peak value.

A method for wireless communication at a second wireless device is described. The method may include receiving, from a first wireless device in one or more symbol periods, a set of data resource elements and a set of pilot resource elements including a demodulation reference signal associated with the set of data resource elements, decoding a second subset of the set of pilot resource elements based on a first subset of the set of pilot resource elements to determine the demodulation reference signal that is associated with the set of data resource elements, and performing a digital post distortion procedure for the received set of data resource elements based on the determined demodulation reference signal.

An apparatus for wireless communication at a second wireless device is described. The apparatus may include a processor, memory coupled with the processor, and instructions stored in the memory. The instructions may be executable by the processor to cause the apparatus to receive, from a first wireless device in one or more symbol periods, a set of data resource elements and a set of pilot resource elements including a demodulation reference signal associated with the set of data resource elements, decode a second subset of the set of pilot resource elements based on a first subset of the set of pilot resource elements to determine the demodulation reference signal that is associated with the set of data resource elements, and perform a digital post distortion procedure for the received set of data resource elements based on the determined demodulation reference signal.

Another apparatus for wireless communication at a second wireless device is described. The apparatus may include means for receiving, from a first wireless device in one or more symbol periods, a set of data resource elements and a set of pilot resource elements including a demodulation reference signal associated with the set of data resource elements, means for decoding a second subset of the set of pilot resource elements based on a first subset of the set of pilot resource elements to determine the demodulation reference signal that is associated with the set of data resource elements, and means for performing a digital post distortion procedure for the received set of data resource elements based on the determined demodulation reference signal.

A non-transitory computer-readable medium storing code for wireless communication at a second wireless device is described. The code may include instructions executable by a processor to receive, from a first wireless device in one or more symbol periods, a set of data resource elements and a set of pilot resource elements including a demodulation reference signal associated with the set of data resource elements, decode a second subset of the set of pilot resource elements based on a first subset of the set of pilot resource elements to determine the demodulation reference signal that is associated with the set of data resource elements, and perform a digital post distortion procedure for the received set of data resource elements based on the determined demodulation reference signal.

In some examples of the method, apparatuses, and non-transitory computer-readable medium described herein, each pilot resource element of the set of pilot resource elements may be modulated according to a quadrature phase shift keying.

Some examples of the method, apparatuses, and non-transitory computer-readable medium described herein may further include operations, features, means, or instructions for receiving, from the first wireless device, an indication of a configuration of the set of pilot resource elements, where receiving the set of pilot resource elements may be based on the indicated configuration of the set of pilot resource elements.

Some examples of the method, apparatuses, and non-transitory computer-readable medium described herein may further include operations, features, means, or instructions for identifying the first subset of the set of pilot resource elements that excludes the second subset of the set of pilot resource elements, where decoding the second subset of the set of pilot resource elements may be based on identifying the first subset of the set of pilot resource elements.

Some examples of the method, apparatuses, and non-transitory computer-readable medium described herein may further include operations, features, means, or instructions for receiving the set of pilot resource elements may be based on the set of pilot resource elements being associated with a metric that satisfies a threshold.

In some examples of the method, apparatuses, and non-transitory computer-readable medium described herein, the metric includes a percentile peak value and the metric satisfying the threshold includes the percentile peak value being above the threshold.

DETAILED DESCRIPTION

Figure 1:
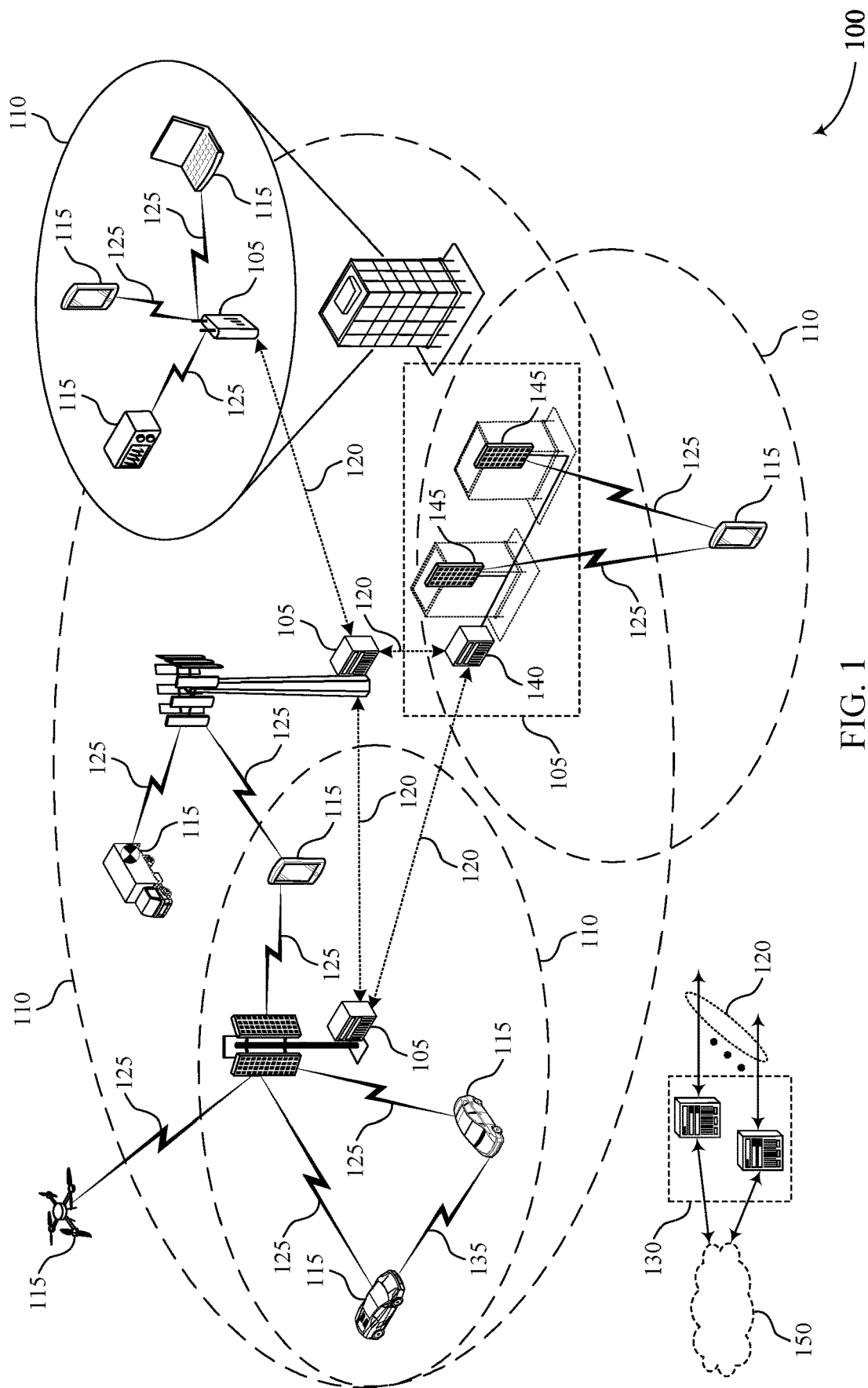
FIG. 1 illustrates an example of a wireless communications system that supports enhanced demodulation reference signal for digital post distortion assist in accordance with aspects of the present disclosure.

A transmitting device may communicate with a receiving device. For instance, the transmitting device may transmit a signal to the receiving device that includes a set of pilot resource elements (e.g., pilot symbols) and a set of data resource elements (e.g., data symbols). The set of pilot resource elements may include a demodulation reference signal (DMRS). In such examples, the set of pilot resource elements may be referred to as DMRS resource elements (e.g., DMRS symbols). The set of data resource elements may include data that the transmitting device is conveying to the receiving device.

In some examples, the receiving device may perform Digital Post Distortion (DPoD), which may be a technique that enables the receiving device to compensate for transmission non-linearities induced by a power amplifier (PA) of the transmitting device when the receiving device receives a transmission from the transmitting device. Performing DPoD may include the receiving device estimating a PA non-linearity model using the set of DMRS resource elements (e.g., using orthogonal frequency division multiplexing (OFDM) symbols including the DMRS resource elements) and the receiving device applying the model to the set of data resource elements and/or phase tracking reference signal (PTRS) resource elements (e.g., to OFDM symbols that do not include DMRS resource elements) using the estimated PA non-linearity model. The closer the non-linearity associated with the set of DMRS resource elements (e.g., or symbols including DMRS resource elements) is to the non-linearity associated with the set of data resource elements and/or the set of PTRS resource elements (e.g., or symbols not including DMRS resource elements), the more accurately the receiving device may be able to compensate for transmission non-linearities, for example as part of a DPoD procedure.

The present disclosure describes techniques that may enable a transmitting device to adjust a 1%-tile peak value associated with OFDM symbols that include pilot resource elements (e.g., the set of DMRS resource elements) such that the non-linearity associated with the OFDM symbols is closer to the non-linearity associated with the OFDM symbols that do not include DMRS resource elements (e.g., symbols that include PTRS resource elements or data resource elements). For instance, for a pilot resource element of the set of pilot resource elements within the OFDM symbol, the transmitting device may identify a set of constellation points that may be mapped to the pilot resource element. The transmitting device may determine a 1%-tile peak value associated with modulating the DMRS resource element according to one or more of the constellation points and may select the constellation point associated with a 1%-tile peak value above a threshold or a highest (e.g., maximum) 1%-tile peak value for the one or more constellation points. The transmitting device may modulate the pilot resource element according to the selected constellation point. By selecting a 1%-tile peak above a threshold or the highest 1%-tile peak value for the pilot resource element, the pilot resource element may have a higher 1%-tile peak value relative to the set of data resource elements, the OFDM symbol that includes the DMRS resource element may be associated with a higher 1%-tile peak. Accordingly, the transmitting device may adjust the 1%-tile peak value of the OFDM symbol including the pilot resource element and may, accordingly, enable the receiving device to compensate for transmission non-linearities more accurately.

Aspects of the disclosure are initially described in the context of wireless communications systems. Additional aspects of the disclosure are described in the context of a communications block diagram and a process flow. Aspects of the disclosure are further illustrated by and described with reference to apparatus diagrams, system diagrams, and flowcharts that relate to enhanced demodulation reference signal for digital post distortion assist.

FIG. 1 illustrates an example of a wireless communications system 100 that supports enhanced demodulation reference signal for digital post distortion assist in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device (e.g., a UE 115, a base station 105) may communicate with a receiving device (e.g., a UE 115, a base station 105). For instance, the transmitting device may transmit a signal to the receiving device that includes a set of pilot resource elements (e.g., pilot symbols) and a set of data resource elements (e.g., data symbols). The set of pilot resource elements may include a demodulation reference signal (DMRS). In such examples, the set of pilot resource elements may be referred to as DMRS resource elements (e.g., DMRS symbols). The set of data resource elements may include data that the transmitting device is conveying to the receiving device. The receiving device may use the PTRS to track and account for phase noise that occurs during communications.

In some examples, the receiving device may perform DPoD, which may be a technique that enables the receiving device to compensate for transmission non-linearities induced by a PA of the transmitting device when the receiving device receives a transmission from the transmitting device. Performing DPoD may include the receiving device estimating a PA non-linearity model using the set of DMRS resource elements (e.g., using OFDM symbols including the DMRS resource elements) and the receiving device applying the model to the set of data resource elements and/or PTRS resource elements (e.g., to OFDM symbols that do not include DMRS resource elements) using the estimated PA non-linearity model. The closer the non-linearity associated with the set of DMRS resource elements (e.g., or symbols including DMRS resource elements) is to the non-linearity associated with the set of data resource elements and/or the set of PTRS resource elements (e.g., or symbols not including DMRS resource elements), the more accurately the receiving device may be able to compensate for transmission non-linearities, for example as part of a DPoD procedure.

The present disclosure describes techniques that may enable a transmitting device to adjust a 1%-tile peak value associated with OFDM symbols that include pilot resource elements (e.g., the set of DMRS resource elements) such that the non-linearity associated with the OFDM symbols is closer to the non-linearity associated with the OFDM symbols that do not include DMRS resource elements (e.g., symbols that include PTRS resource elements or data resource elements). For instance, for a pilot resource element of the set of pilot resource elements within the OFDM symbol, the transmitting device may identify a set of constellation points that may be mapped to the pilot resource element. The transmitting device may determine a 1%-tile peak value associated with modulating the DMRS resource element according to one or more of the constellation points and may select the constellation point associated with a 1%-tile peak value above a threshold or a highest (e.g., maximum) 1%-tile peak value for the one or more constellation points. The transmitting device may modulate the pilot resource element according to the selected constellation point. By selecting a 1%-tile peak above a threshold or the highest 1%-tile peak value for the pilot resource element, the pilot resource element may have a higher 1%-tile peak value relative to the set of data resource elements, the OFDM symbol that includes the DMRS resource element may be associated with a higher 1%-tile peak. Accordingly, the transmitting device may adjust the 1%-tile peak value of the OFDM symbol including the pilot resource element and may, accordingly, enable the transmitting device to compensate for transmission non-linearities more accurately.

Figure 2:
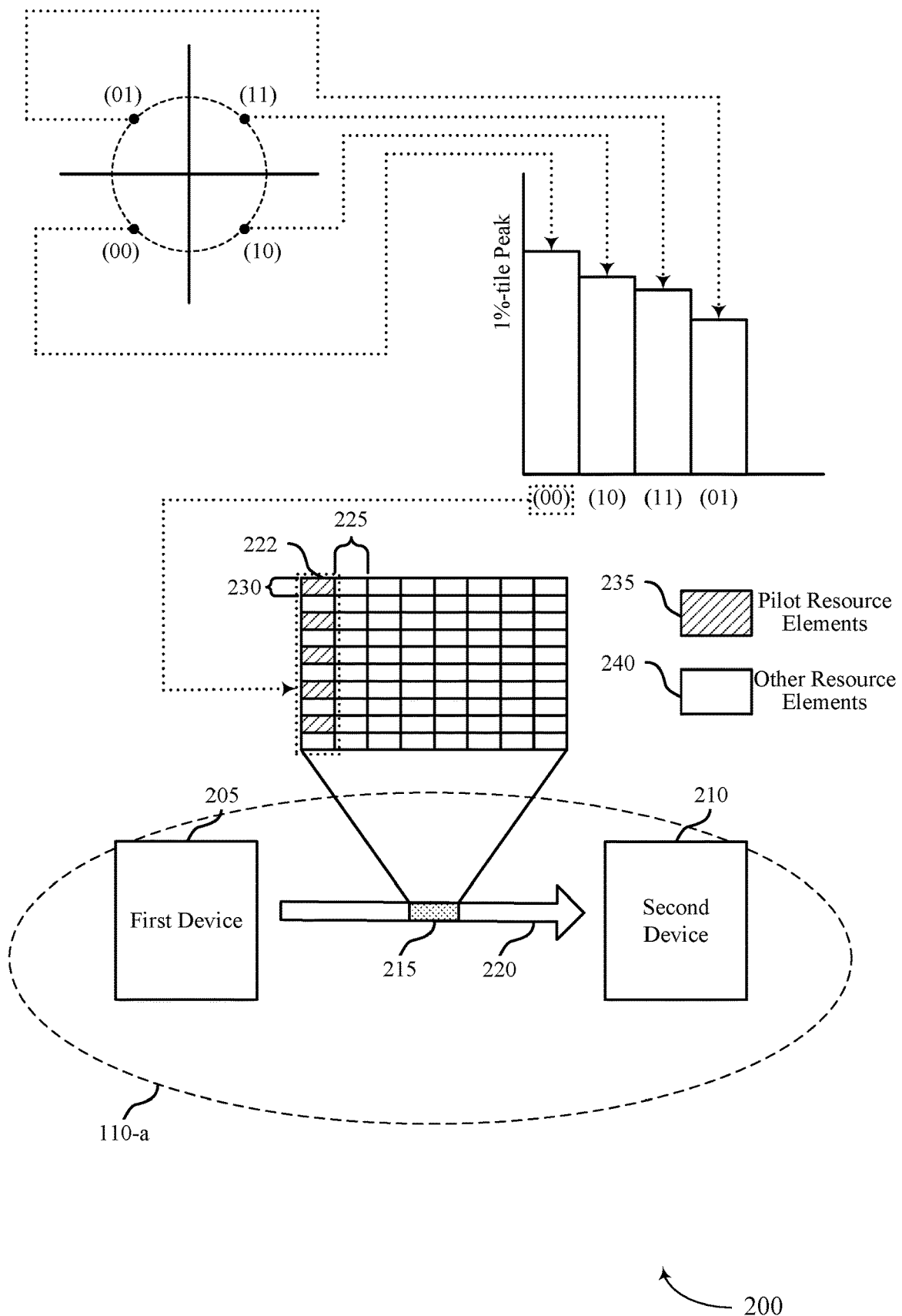
FIG. 2 illustrates an example of a wireless communications system that supports enhanced demodulation reference signal for digital post distortion assist in accordance with aspects of the present disclosure.

FIG. 2 illustrates an example of a wireless communications system 200 that supports enhanced demodulation reference signal for digital post distortion assist in accordance with aspects of the present disclosure. For instance, the first device 205 and the second device 210 may each be examples of a UE 115 or a base station 105 as described with reference to FIG. 1. A first device 205 (e.g., a first wireless device that may be referred to as a transmitting device) may communicate with a second device 210 (e.g., a first wireless device that may be referred to as a receiving device). For instance, first device 205 may transmit transmission 215 to second device 210 over channel 220. In some examples, second device 210 may be within a geographic coverage area 110 a of first device 205.

In some examples, transmission 215 may be an example of a data transmission. The transmitting device may reserve resources for the data transmission. The resources reserved for the data transmission may include one or more resource elements 222. Each resource element may span a time unit 225 (e.g., a symbol period, an OFDM symbol) and a frequency unit 230 (e.g., a subcarrier). A first set of the resource elements may be data resource elements (e.g., data resource elements) and a second set of the resource elements may be DMRS resource elements 235. In some examples, the DMRS resource elements 235 may include a DMRS. The other resource elements 240 may correspond to the data resource elements and/or phase tracking reference signal (PTRS) resource elements.

The DMRS resource elements 235 may include a DMRS. In some examples, the DMRS may be or be referred to as an enhanced DMRS (eDMRS). The eDMRS may have one of multiple possible waveforms (e.g., the eDMRS may not be a pre-defined unique sequence). The waveform selected for the eDMRS may have a highest or lowest value of one or more criteria. If the first device 205 transmits an eDMRS to the second device 210 (e.g., over one or more of the set of DMRS resource elements 235), the second device 210 may decode (e.g., blindly decode) the eDMRS pattern and may extract the information embedded in it. After the second device 210 performs the decoding, the second device 210 may identify the eDMRS sequence. Accordingly, the second device 210 may use the eDMRS for channel estimation.

In some examples, the second device 210 may perform DPoD. DPoD may be a technique that enables the first device 205 to transmit close to (e.g., within a threshold value of) a compression point of a PA for the first device 205 and/or may enable the second device 210 to compensate for transmission non-linearities induced by the PA of the second device 210 when the second device 210 receives a transmission from the first device 205. Performing DPoD may enable the first device 205 to transmit at a higher power and may improve an signal to noise ratio (SNR) and/or capacity relative to other techniques. Performing DPoD may also enable the first device 205 to transmit with a lower error vector magnitude (EVM) when performing quadrature amplitude modulation (QAM) (e.g., superQAM, which may include QAM of 1024QAM and above) or other modulation techniques having a large constellation size (e.g., greater than 1024 points) relative to other techniques. A lower EVM may enable the first device 205 to use a smaller PA backoff and may increase the range of communications. Accordingly, performing DPoD may enable increased communications efficiency.

DPoD techniques may include modeling a non-linearity impairment as an additive signal, estimating the non-linearity impairment, and subtracting the non-linearity impairment from a received signal (e.g., through an iterative process). For instance, DPoD may include two phases. The first phase may include estimating a PA non-linearity model, which may be performed on a set of DMRS resource elements 235 (e.g., or a set of OFDM symbols that include DMRS resource elements). The second phase may include removing the non-linearity impairment from each data resource element of the other resource elements 240 using the estimated PA non-linearity model (e.g., or OFDM symbols that do not include DMRS resource elements and/or that include data resource elements). In some examples, the non-linearity may be data dependent and may vary per data resource element. In some examples, the non-linearity may be based on a distribution of symbol time domain signal peaks and an overall signal peak to average power ratio (PAPR). For instance, a lower signal 1%-tile peak value (e.g., at least 1% of samples having a higher amplitude) may decrease non-linearity and a higher 1%-tile peak value may increase non-linearity.

In some examples, the 1%-tile peak value may be different (e.g., vary) between the DMRS resource elements 235 and the data resource elements and/or between OFDM symbols that include DMRS resource elements 235 and OFDM symbols that do not include DMRS resource elements. Due to the 1%-tile peak value being different, data resource elements (e.g., or OFDM symbols that do not include DMRS resource elements 235 and/or that include data resource elements) may experience higher non-linearities than DMRS resource elements 235 (e.g., or OFDM symbols that do include DMRS resource elements 235). Accordingly, a PA model mismatch may occur between estimating the PA model using the DMRS resource elements 235 (e.g., or OFDM symbols that do include DMRS resource elements 235) and applying the PA model to the data resource elements (e.g., or OFDM symbols that do not include DMRS resource elements 235 and/or that do include data resource elements). Accordingly, DPoD performance may exhibit error floor behavior.

The present disclosure may relate to methods by which the non-linearity of a DMRS resource element 235 (e.g., or of an OFDM symbol that includes DMRS resource elements 235) may be increased using eDMRS. For instance, a 1%-tile peak value of the DMRS resource elements 235 may be increased (e.g., in a manner that does not affect EVM or has a small effect on EVM, e.g., below a threshold effect). By increasing the 1%-tile peak value in this manner, model mismatch may be reduced, for example reduced below a threshold level, or eliminated, and DPoD performance may improve. Additionally or alternatively, the probability for model mismatch may be reduced and may improve rate-over-range.

In some examples, the 1%-tile peak value of an OFDM symbol including the DMRS resource elements 235 may be increased by transmitting a quadrature phase shift keying (QPSK) signal in some or each DMRS resource elements 235. In some examples, first device 205 may identify a set of QPSK constellation points (e.g., (00), (01), (10), and (11))

and may determine a 1%-tile peak value associated with each constellation point. For instance, in the present example for a particular DMRS resource element 235, the first device 205 may determine that constellation point (01) is associated with a lowest 1%-tile peak value for an OFDM symbol, constellation point (11) is associated with a next lower 1%-tile peak value for the OFDM symbol, constellation point (10) is associated with a next lowest 1%-tile peak value for the OFDM symbol, and constellation point (00) is associated with a highest 1%-tile peak value for the OFDM symbol. After determining the PAPR associated with each constellation point, the first device 205 may select the constellation point associated with a 1%-tile peak value above a threshold or the constellation point with the highest 1%-tile peak value for the OFDM symbol. In the present example, the first device 205 may select constellation point (00) if constellation point (00) has the highest 1%-tile peak value. After selecting the constellation point, first device 205 may modulate the DMRS resource element 235 according to the selected constellation point.

In some examples, the first device 205 may perform a sequential greedy method to determine the constellation point. For instance, in one example, an OFDM symbol may include N DMRS resource elements 235 which may be numbered 1 through N. In a first iteration of a sequential greedy method, a 1%-tile peak value may be calculated for the 1st DMRS resource element 235 by assuming that each of the other N−1 DMRS resource elements 235 have a 0 value (e.g., carry no signal). The first device 205 may calculate the 1%-tile peak value of each hypothesis (e.g., 4 hypotheses) obtained by modulating the 1st DMRS resource element 235 according to each possible constellation point value of a set of constellation points. The first device 205 may select the best 1%-tile peak value (e.g., the highest PAPR) and may set (e.g., fix) the value of the DMRS resource element 235 to the constellation point corresponding to the best DMRS value. In the mth iteration of the method, 1%-tile peak value may be calculated for the mth DMRS resource element 235 by assuming that each of the previous DMRS resource elements 235 (e.g., 1 to m−1) are modulated according to the previously selected constellation point and that each of the following DMRS resource elements 235 (e.g., m+1 to N) have a 0 value (e.g., carry no signal). As with the 1st DMRS resource element 235, the first device 205 may calculate the 1%-tile peak value of each hypothesis obtained by modulating the mth DMRS resource element 235 according to each possible constellation point value of the set of constellation points. The first device 205 may selected the best 1%-tile peak value (e.g., the highest 1%-tile peak value) and may set (e.g., fix) the value of the DMRS resource element 235 to the constellation point corresponding to the best 1%-tile peak value. In some examples, the first device 205 may repeat this method for some or each other DMRS resource element 235. In this manner, the first device 205 may determine a sequence for the one or more eDMRSs associated with the DMRS resource elements 235. In some examples, the sequential greedy method may be performed offline, which may reduce complexity (e.g., computational complexity) at the first device 205.

In some examples, a certain percentage of DMRS resource elements 235 x % (e.g., 25%) may be kept constant to enable initial channel estimated for detection of the rest of the eDMRS. The remaining percentage (100%-x %) may be used to increase 1%-tile of peaks. In some examples, the eDMRS resource elements in reserved tones may be constrained to be used for QPSK modulation, which may enable more reliable detection of the signal and may enable use of the eDMRS sequence for channel estimation. Additionally or alternatively, the process of determining QPSK symbols may be predefined (e.g., performed offline), which may reduce the complexity (e.g., computation complexity) to the first device 205 or the second device 210. In such options, decoding DMRSs in advance by the second device 210 may not occur. However, the first device 205 may transmit signaling to the second device 210 notifying the second device 210 on the DMRS used (e.g., the DMRS sequence used).

Although the present methods describing increasing 1%-tile peak value, there may be examples where the present methods may be used to decrease 1%-tile peak value. For instance, if the non-linearity associated with DMRS resource elements 235 (e.g., or OFDM symbols that include DMRS resource elements 235) is higher than that associated data resource elements (e.g., or OFDM symbols that include data resource elements), the present methods may instead be used to decrease a 1%-tile peak value associated with DMRS resource elements 235 (e.g., associated with OFDM symbols that include DMRS resource elements 235). Additionally or alternatively, although examples are described herein with regards to 1%-tile peak values, it should be noted that there may be examples where the present methods may use peak to average power ratio (PAPR) instead of or along with 1%-tile peak value. For instance, the constellation point that is selected may be the one with a lowest or highest PAPR value associated with the OFDM symbol that includes the DMRS resource element 235.

In some examples, the methods as described herein may be associated with one or more advantages. For instance, adjusting the 1%-tile peak value of the DMRS resource elements 235 may lower a probability that PA mismatch may occur. In some examples, the first device 205 may use a smaller PA backoff and/or may increase a range of communications.

Figure 3:
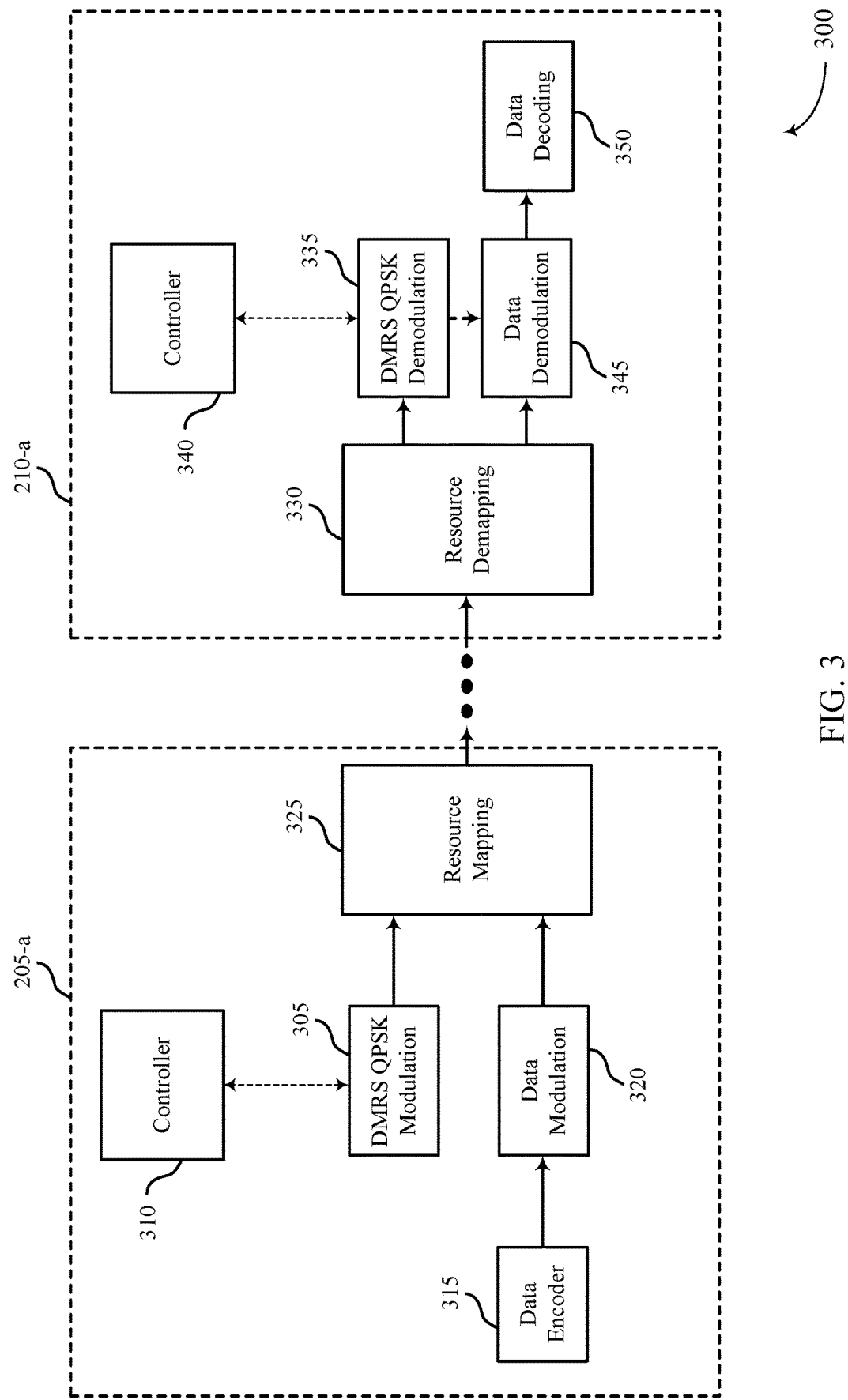
FIG. 3 illustrates an example of a communications block diagram that supports enhanced demodulation reference signal for digital post distortion assist in accordance with aspects of the present disclosure.

FIG. 3 illustrates an example of a communications block diagram 300 that supports enhanced demodulation reference signal for digital post distortion assist in accordance with aspects of the present disclosure In some examples, communications block diagram 300 may implement one or more aspects of wireless communications systems 100 and/or 200. For instance, first device 205-a may be an example of a first device 205 as described with reference to FIG. 2 and second device 210-a may be an example of a second device 210 as described with reference to FIG. 2. Additionally or alternatively, each of first device 205-a and second device 210-a may be an example of a base station 105 or a UE 115. In some examples, each or some of methods described herein may be performed by a controller (e.g., a controller 310 or a controller 340 as described herein).

Initially, first device 205-a may determine that first device 205-a has data to transmit to second device 210-a. First device 205-a may modulate a DMRS (e.g., eDMRS) according to QPSK modulation (e.g., using a DMRS QPSK modulator 305). Modulating the DMRS may include the DMRS QPSK modulator 305 and/or a controller 310 determining a constellation point that is associated with a highest 1%-tile peak value or a 1%-tile peak value below a threshold for each of a set of DMRS resource elements and performing QPSK modulation according to each determined constellation point. The data encoder 315 may encode the data and data modulator 320 may modulate the data, After performing modulation for the data and the DMRS, resource mapper 325 may map the modulated DMRS to respective DMRS resource elements and the data to one or more data resource elements. After the resource mapper 325 performs the mapping, first device 205-a may transmit a signal including the modulated DMRS and the data to second device 210-a.

Second device 210-a may receive the signal and may perform demapping on the signal. For instance, resource demapper 330 may identify resources corresponding to the modulated DMRS (e.g., DMRS resource elements) and data (e.g., data resource elements) and may demap the resources. DMRS QPSK demodulator 335 may demodulate the modulated DMRS. In some examples, controller 340 may perform the demodulating.

Second device 210-a may also demodulate the data via data demodulator 345 and may decode the data via data decoder 350. In some examples, data demodulator 345 may use the demodulated DMRS for data demodulation. For instance, second device 210-a may estimate phase noise using the demodulated DMRS and data demodulator 345 may use the estimated phase noise to perform data demodulation.

Figure 4:
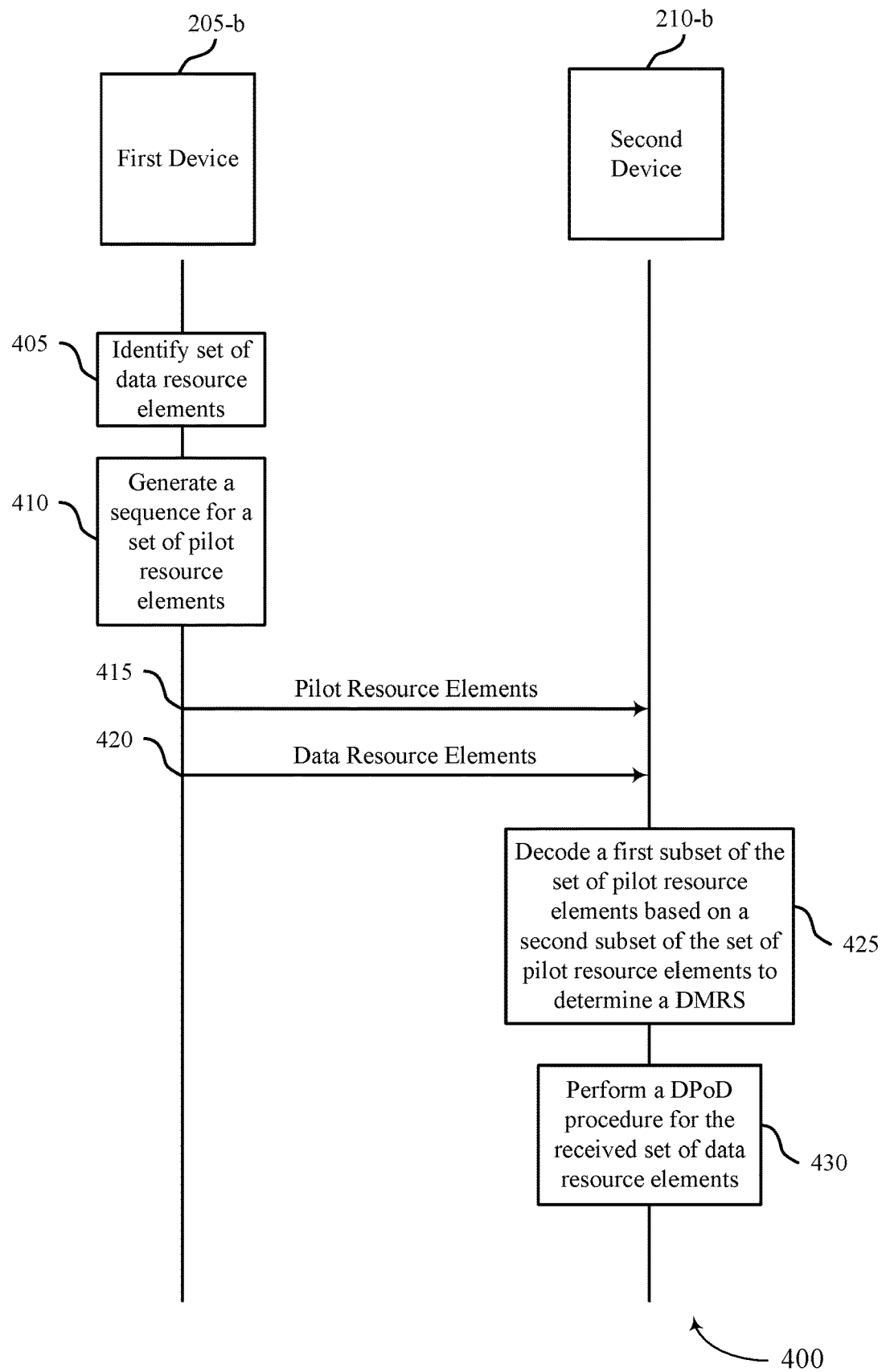
FIG. 4 illustrates an example of a process flow that supports enhanced demodulation reference signal for digital post distortion assist in accordance with aspects of the present disclosure.

FIG. 4 illustrates an example of a process flow 400 that supports enhanced demodulation reference signal for digital post distortion assist in accordance with aspects of the present disclosure. Process flow 400 may be implemented by one or more aspects of wireless communications systems 100 and/or 200. For instance, first device 205-b may be an example of a first device 205 as described with reference to FIG. 2 and second device 210-b may be an example of a second device 210 as described with reference to FIG. 2. Additionally or alternatively, each of first device 205-b and second device 210-b may be an example of a base station 105 or a UE 115.

At 405, first device 205-b may identify a set of resource elements for transmitting data in one or more symbol periods.

At 410, first device 205-b may generate, for the one or more symbol periods based on the set of data resource elements, a sequence of a set of pilot resource elements associated with the set of data resource elements, the sequence of the set of pilot resource elements including a DMRS. In some examples, generating the sequence may include selecting the sequence from a set of candidate sequences. In some examples, the sequence is selected from the set of candidate sequences based on a metric for the set of pilot resource elements of the one or more symbol periods and/or the set of data resource elements satisfying a threshold. The metric may include a percentile peak value and satisfying the threshold may include the percentile peak value being above the threshold. Additionally or alternatively, a metric may have a set of values that includes a value for each sequence of the set of candidate sequences. In such examples, the sequence may be selected from the set of candidate sequences based on the metric associated with the sequence having a lowest value or a highest value of the set of values.

In some examples, generating the sequence may include selecting the sequence from a set of sequences, where transmitting the set of pilot resource elements is based on selecting the sequence from the set of sequences. In some examples, the sequence may be selected from the set of sequences based on a metric for the sequence satisfying a threshold. In some examples, the metric may include a percentile peak value and satisfying the threshold may include the percentile peak value being above the threshold. In some examples, each sequence of the set of candidate sequences may have an associated value of a metric and the sequence may be selected from the set of sequences based on the associated value of the metric of the sequence having a lowest value or a highest value relative to the value of the metric for each other sequence of the set of candidate sequences.

In some examples, generating the sequence may include identifying a set of constellation points associated with a pilot resource element of the set of pilot resource elements, determining a value of a metric for the pilot resource element for each constellation point of the set of constellation points, and selecting, for the pilot resource element, a constellation point of the set of constellation points based on determining the value of the metric for each constellation point of the set of constellation points. In some examples, generating the sequence includes identifying a set of constellation points associated with a second pilot resource element of the set of pilot resource elements, determining a second value of the metric for the second pilot resource element for each constellation point of the second set of constellation points, selecting, for the second pilot resource element, a second constellation point of the second set of constellation points based on determining the second value of the metric for each constellation point of the second set of constellation points.

In some examples first device 205-*b* may identify a first subset of the set of pilot resource elements that excludes a second subset of the set of pilot resource elements, where the second subset of the set of pilot resource elements includes the first pilot resource element and the second pilot resource element. In some examples, first device 205-*b* may select, for each pilot resource element of the second subset of the set of pilot resource elements, a respective constellation point of a respective set of constellation points based on determining a respective value of the metric for each constellation point of the respective set of constellation points, where transmitting the set of pilot resource elements is based at least in part on selecting the respective constellation point for each pilot resource element of the second subset of the set of pilot resource elements. In some examples, first device 205-*b* may refrain from determining a respective value of the metric for each pilot resource element of the first subset of the set of pilot resource elements, where transmitting the set of pilot resource elements is based at least in part on the refraining. In some examples, the metric may include a percentile peak, where selecting the constellation point includes determining, for each constellation point of the set of constellation points, a percentile peak value over a symbol period that overlaps in time with the first pilot resource element and selecting a first constellation point of the set of constellation points associated with a higher percentile peak value than that of a second constellation point of the set of constellation points. In some examples, the first constellation point may be associated with a highest percentile peak of each constellation point in the set of constellation points.

In some examples, generating the sequence may include identifying a set of constellation points for each pilot resource element of the set of pilot resource elements; generating a plurality of sequences of constellation points, wherein each sequence of constellation points comprises one constellation point from each set of constellation points for the set of pilot resource elements; determining, for each sequence of constellation points of the plurality, a value of a metric; and selecting, for the set of pilot resource elements, a sequence of constellation points from the plurality based on determining the value of the metric for each constellation point of the set of constellation points, where transmitting the set of pilot resource elements is based on selecting the sequence of constellation points.

In some examples, first device 205-*b* may identify a number of constellation points associated with performing quadrature amplitude modulation (QAM) on a pilot resource element of the set of pilot resource elements, where generating the sequence is based at least in part on the number of constellation points being above a threshold. For instance, for below 1024QAM, first device 205-*b* may not generate the sequence based on determining a 1%-tile peak value for each pilot symbol of the set of pilot symbols. However, for 1024QAM and above, first device 205-*b* may generate the sequence based on determining the 1%-tile peak value for each pilot symbol of the set of pilot symbols.

At 415, first device 205-*b* may transmit, to second device 210-*b* in the one or more symbols, the set of pilot resource elements associated with the set of data resource elements. At 420, first device 205-*b* may transmit, to second device 210-*b* in the one or more symbols, the set of data resource elements. In some examples, transmitting the set of pilot resource elements is based on selecting the sequence from the set of candidate sequences. In some examples, transmitting the set of pilot resource elements may be based on selecting the constellation point and/or selecting the second constellation point.

In some examples, first device 205-*b* may transmit, to second device 210-*b*, an indication of a first subset of the set of pilot resource elements, where the first subset of the set of resource elements excludes at least one pilot resource element of the set of pilot resource elements. In some examples, transmitting the set of pilot resource elements may be based on transmitting the indication of the first subset of the set of pilot resource elements. In some examples, transmitting the indication of the first subset of the set of pilot resource elements includes transmitting configuration signaling identifying the first subset of the set of pilot resource elements. In some examples, transmitting the configuration signaling identifying the first subset of the set of pilot resource elements includes transmitting a DMRS identifying the first subset of the set of pilot resource elements. In some examples, first device 205-*b* may identify a first subset of the set of pilot resource elements that excludes a second subset of the set of pilot resource elements, where transmitting the set of pilot resource elements is based on identifying the first subset of the set of pilot resource elements. In some examples, first device 205-*b* may modulate each pilot resource element using QPSK, where transmitting the set of pilot resource elements is based on the modulating.

At 425, second device 210-*b* may decode a second subset of the set of pilot resource elements based on a first subset of the set of pilot resource elements to determine the DMRS that is associated with the set of data resource elements. In some examples, second device 210-*b* may identify the first subset of the set of pilot resource elements that excludes the second subset of the set of pilot resource elements, where decoding the second subset of the set of pilot resource elements is based on identifying the first subset of the set of pilot resource elements. In some examples, receiving the set of pilot resource elements is based on the sequence that has a lowest or highest value of the metric for the set of values.

At 430, second device 210-*b* may perform a DPoD procedure for the received set of data resource elements based on the determined DMRS.

Figure 5:
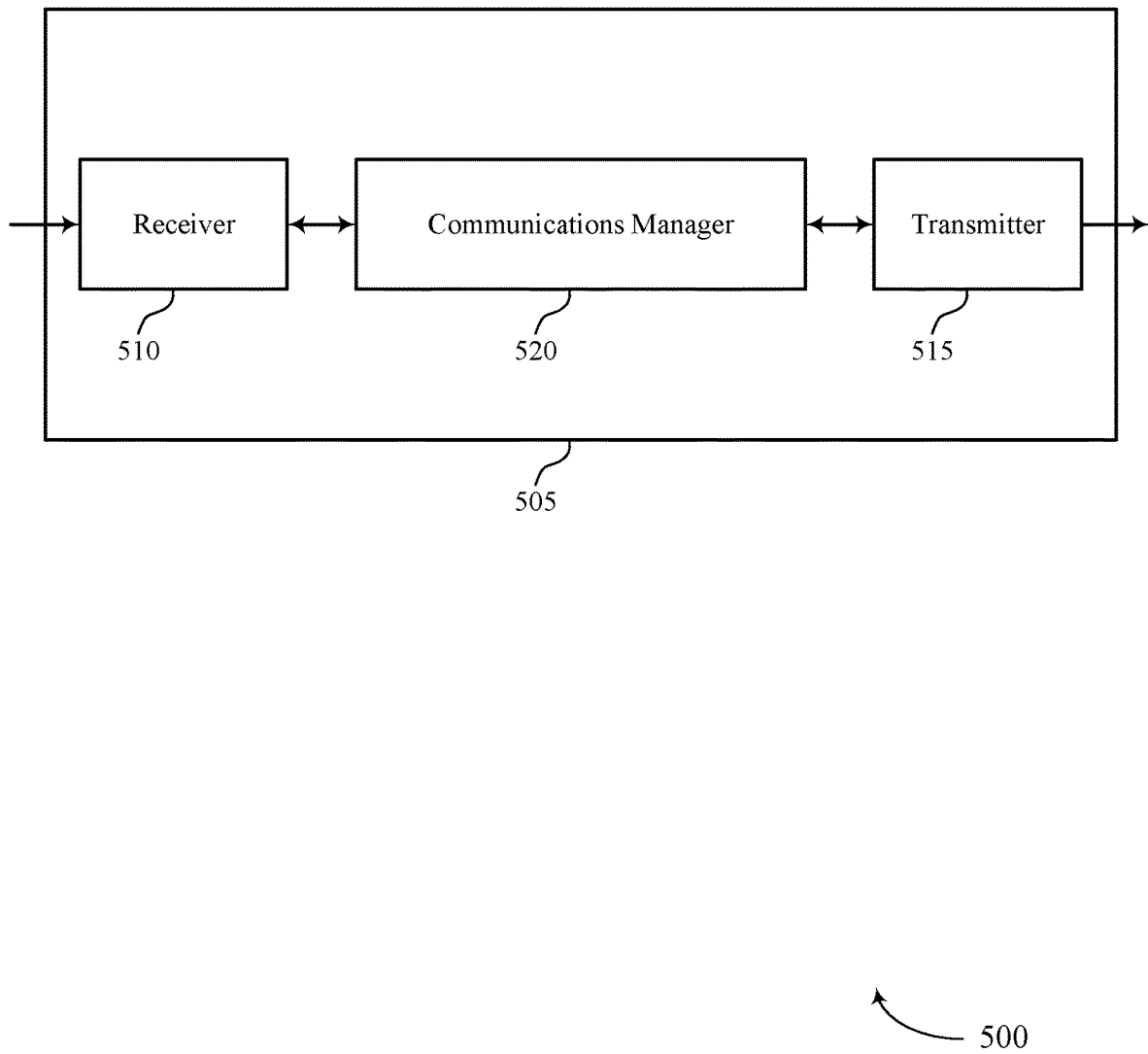
FIGS. 5 and 6 show block diagrams of devices that support enhanced demodulation reference signal for digital post distortion assist in accordance with aspects of the present disclosure.

FIG. 5 shows a block diagram 500 of a device 505 that supports enhanced demodulation reference signal for digital post distortion assist in accordance with aspects of the present disclosure. The device 505 may be an example of aspects of a UE 115, a base station 105, or a first device 205 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced demodulation reference signal for digital post distortion assist). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced demodulation reference signal for digital post distortion assist). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhanced demodulation reference signal for digital post distortion assist as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for identifying a set of data resource elements for transmitting data in one or more symbol periods. The communications manager 520 may be configured as or otherwise support a means for generating, for the one or more symbol periods basing at least in part on the set of data resource elements, a sequence of a set of pilot resource elements associated with the set of data resource elements, the sequence of the set of pilot resource elements including a demodulation reference signal. The communications manager 520 may be configured as or otherwise support a means for transmitting, to a second wireless device in the one or more symbol periods, the set of data resource elements and the set of pilot resource elements associated with the set of data resource elements.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the device 505 to compensate for transmission non-linearities induced by the PA of a device receiving the set of data resource elements and the set of pilot resource elements. Additionally or alternatively, the techniques described herein may lower a probability that PA mismatch may occur, may enable the device 505 to use a smaller PA backoff, may increase a range of communications, or any combination thereof.

Figure 6:
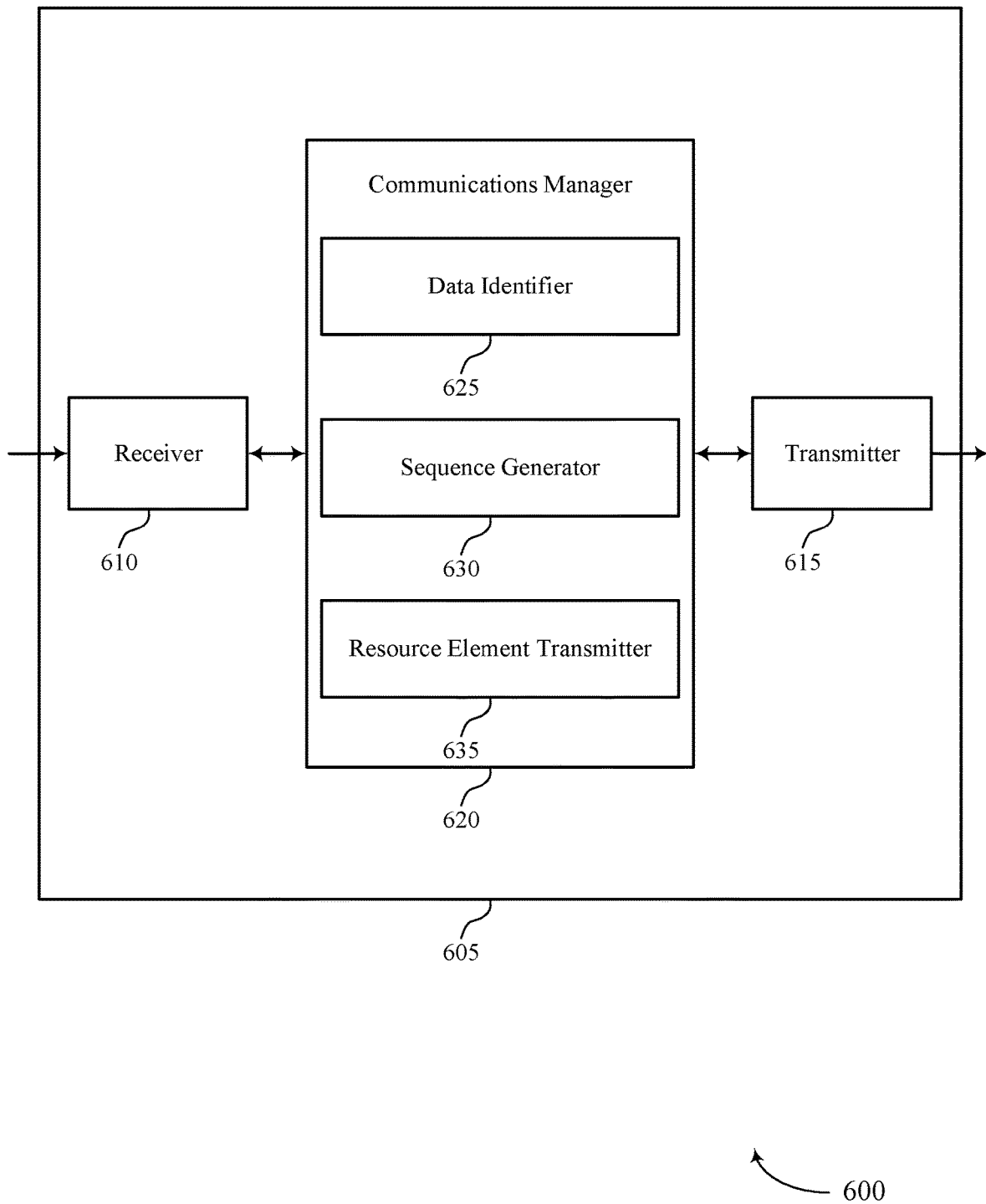

FIG. 6 shows a block diagram 600 of a device 605 that supports enhanced demodulation reference signal for digital post distortion assist in accordance with aspects of the present disclosure. The device 605 may be an example of aspects of a device 505, a UE 115, a base station 105, or a first device 205 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced demodulation reference signal for digital post distortion assist). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced demodulation reference signal for digital post distortion assist). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced demodulation reference signal for digital post distortion assist as described herein. For example, the communications manager 620 may include a data identifier 625, a sequence generator 630, a resource element transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The data identifier 625 may be configured as or otherwise support a means for identifying a set of data resource elements for transmitting data in one or more symbol periods. The sequence generator 630 may be configured as or otherwise support a means for generating, for the one or more symbol periods based on the set of data resource elements, a sequence of a set of pilot resource elements associated with the set of data resource elements, the sequence of the set of pilot resource elements including a demodulation reference signal. The resource element transmitter 635 may be configured as or otherwise support a means for transmitting, to a second wireless device in the one or more symbol periods, the set of data resource elements and the set of pilot resource elements associated with the set of data resource elements.

Figure 7:
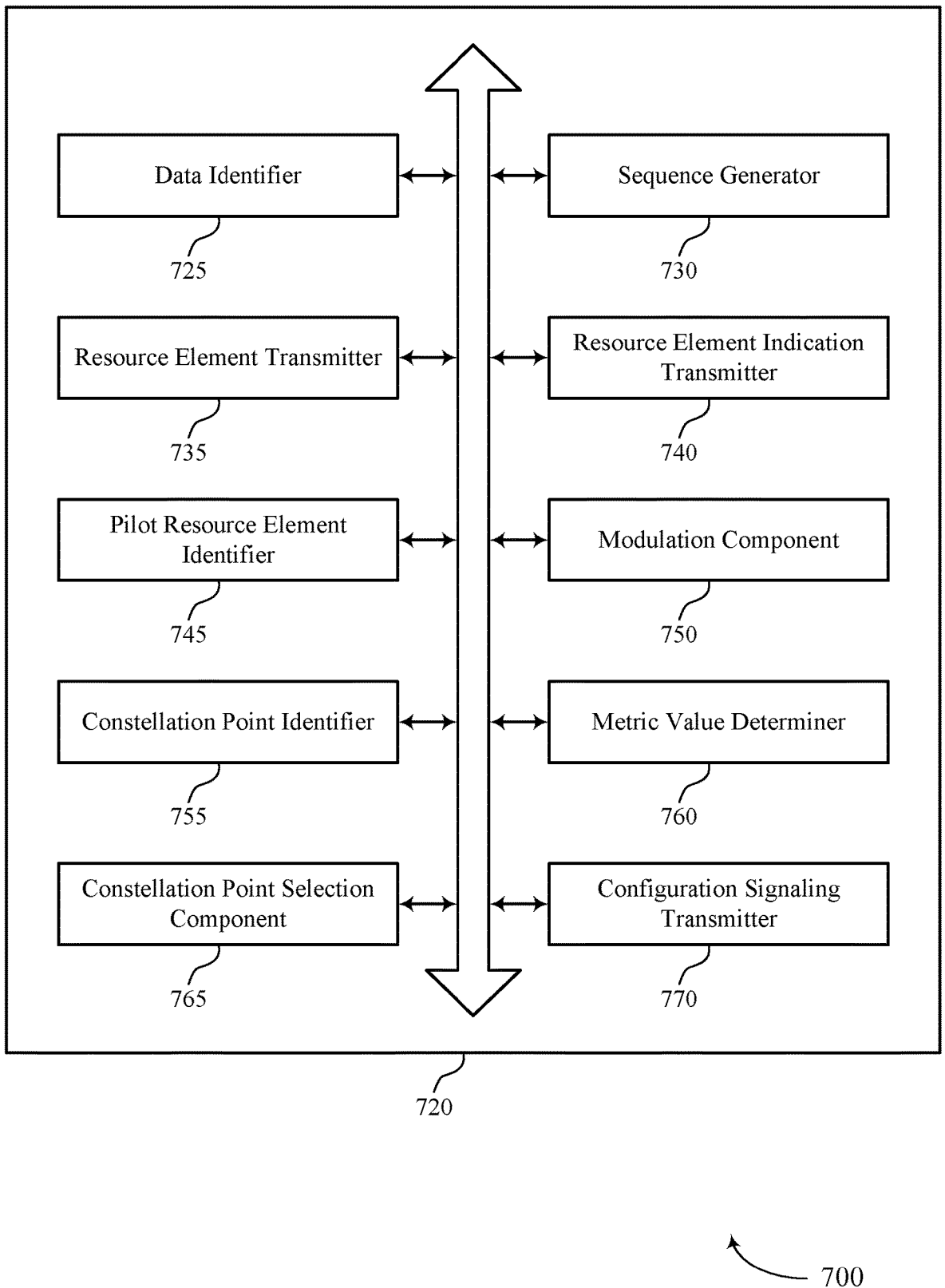
FIG. 7 shows a block diagram of a communications manager that supports enhanced demodulation reference signal for digital post distortion assist in accordance with aspects of the present disclosure.

FIG. 7 shows a block diagram 700 of a communications manager 720 that supports enhanced demodulation reference signal for digital post distortion assist in accordance with aspects of the present disclosure. The communications manager 720 may be an example of aspects of a communications manager 520, a communications manager 620, or both, as described herein. The communications manager 720, or various components thereof, may be an example of means for performing various aspects of enhanced demodulation reference signal for digital post distortion assist as described herein. For example, the communications manager 720 may include a data identifier 725, a sequence generator 730, a resource element transmitter 735, a resource element indication transmitter 740, a pilot resource element identifier 745, a modulation component 750, a constellation point identifier 755, a metric value determiner 760, a constellation point selection component 765, a configuration signaling transmitter 770, or any combination thereof. Each of these components may communicate, directly or indirectly, with one another (e.g., via one or more buses).

The communications manager 720 may support wireless communication at a first wireless device in accordance with examples as disclosed herein. The data identifier 725 may be configured as or otherwise support a means for identifying a set of data resource elements for transmitting data in one or more symbol periods. The sequence generator 730 may be configured as or otherwise support a means for generating, for the one or more symbol periods based on the set of data resource elements, a sequence of a set of pilot resource elements associated with the set of data resource elements, the sequence of the set of pilot resource elements including a demodulation reference signal. The resource element transmitter 735 may be configured as or otherwise support a means for transmitting, to a second wireless device in the one or more symbol periods, the set of data resource elements and the set of pilot resource elements associated with the set of data resource elements.

In some examples, the resource element indication transmitter 740 may be configured as or otherwise support a means for transmitting, to the second wireless device, an indication of a first subset of the set of pilot resource elements, where the first subset of the set of pilot resource elements excludes at least one pilot resource element of the set of pilot resource elements, and where transmitting the set of pilot resource elements is based on transmitting the indication of the first subset of the set of pilot resource elements.

In some examples, to support transmitting of the indication of the first subset of the set of pilot resource elements, the configuration signaling transmitter 770 may be configured as or otherwise support a means for transmitting configuration signaling identifying the first subset of the set of pilot resource elements.

In some examples, to support transmitting the configuration signaling identifying the first subset of the set of pilot resource elements, the configuration signaling transmitter 770 may be configured as or otherwise support a means for transmitting a demodulation reference signal configuration identifying the first subset of the set of pilot resource elements.

In some examples, the pilot resource element identifier 745 may be configured as or otherwise support a means for identifying a first subset of the set of pilot resource elements that excludes a second subset of the set of pilot resource elements, where transmitting the set of pilot resource elements is based on identifying the first subset of the set of pilot resource elements.

In some examples, to support determining the sequence, the sequence generator 730 may be configured as or otherwise support a means for selecting the sequence from a set of sequences, where transmitting the set of pilot resource elements is based on selecting the sequence from the set of sequences.

In some examples, the sequence is selected from the set of sequences based on a metric for the sequence satisfying a threshold.

In some examples, the metric includes a percentile peak value and. In some examples, satisfying the threshold includes the percentile peak value being above the threshold.

In some examples, each sequence of the set of candidate sequences has an associated value of a metric and the sequence is selected from the set of sequences based at least in part on the associated value of the metric of the sequence having a lowest value or a highest value relative to the value of the metric for each other sequence of the set of candidate sequences.

In some examples, the modulation component 750 may be configured as or otherwise support a means for modulating each pilot resource element of the set of pilot resource elements using quadrature phase shift keying, where transmitting the set of pilot resource elements is based on the modulating.

In some examples, the constellation point identifier 755 may be configured as or otherwise support a means for identifying a set of constellation points associated with a pilot resource element of the set of pilot resource elements. In some examples, the metric value determiner 760 may be configured as or otherwise support a means for determining a value of a metric for the pilot resource element for each constellation point of the set of constellation points. In some examples, the constellation point selection component 765 may be configured as or otherwise support a means for selecting, for the pilot resource element, a constellation point of the set of constellation points based on determining the value of the metric for each constellation point of the set of constellation points, where transmitting the set of pilot resource elements is based on selecting the constellation point.

In some examples, the constellation point identifier 755 may be configured as or otherwise support a means for identifying a second set of constellation points associated with a second pilot resource element of the set of pilot resource elements. In some examples, the metric value determiner 760 may be configured as or otherwise support a means for determining a second value of the metric for the second pilot resource element for each constellation point of the second set of constellation points. In some examples, the constellation point selection component 765 may be configured as or otherwise support a means for selecting, for the second pilot resource element, a second constellation point of the second set of constellation points based on determining the second value of the metric for each constellation point of the second set of constellation points, where transmitting the set of pilot resource elements is based on selecting the second constellation point.

In some examples, the pilot resource element identifier 745 may be configured as or otherwise support a means for identifying a first subset of the set of pilot resource elements that excludes a second subset of the set of pilot resource elements, where the second subset of the set of pilot resource elements comprises the first pilot resource element and the second pilot resource element. In some examples, the sequence generator 730 may be configured as or may otherwise support a means for selecting, for each pilot resource element of the second subset of the set of pilot resource elements, a respective constellation point of a respective set of constellation points based on determining a respective value of the metric for each constellation point of the respective set of constellation points, where transmitting the set of pilot resource elements is based at least in part on selecting the respective constellation point for each pilot resource element of the second subset of the set of pilot resource elements. In some examples, the sequence generator 730 may be configured as or may otherwise support a means for refraining from determining a respective value of the metric for each pilot resource element of the first subset of the set of pilot resource elements, where transmitting the set of pilot resource elements is based at least in part on the refraining.

In some examples, the metric may include a percentile peak and selecting the constellation point may include determining, for each constellation point of the set of constellation points, a percentile peak value over a symbol period that overlaps in time with the first pilot resource element and selecting a first constellation point of the set of constellation points associated with a higher percentile peak value than that of a second constellation point of the set of constellation points. In some examples, the first constellation point may be associated with a highest percentile peak of each constellation point in the set of constellation points.

In some examples, the constellation point identifier 755 may be configured as or otherwise support a means for identifying a set of constellation points for each pilot resource element of the set of pilot resource elements. In some examples, sequence generator 730 may be configured as or otherwise support a means for generating a plurality of sequences of constellation points, where each sequence of constellation points comprises one constellation point from each set of constellation points for the set of pilot resource elements. In some examples, the metric value determiner 760 may be configured as or otherwise support a means for determining, for each sequence of constellation points of the plurality, a value of a metric. In some examples, the constellation point selection component 765 may be configured as or otherwise support a means for selecting, for the set of pilot resource elements, a constellation point of the set of constellation points based on determining the value of the metric for each constellation point of the set of constellation points, where transmitting the set of pilot resource elements is based on selecting the sequence of constellation points.

In some examples, sequence generator 730 may be configured as or otherwise support a means for identifying a number of constellation points associated with performing quadrature amplitude modulation on a data resource element of the set of data resource elements, where generating the sequence is based at least in part on the number of constellation points being above a threshold.

In some examples, the resource element transmitter 735 may be configured as or otherwise support a means for transmitting, to the second wireless device in the one or more symbol periods, a second set of pilot resource elements associated with the set of data resource elements, where the set of pilot resource elements is associated with a first set of values of a metric whose average is higher than a second set of values of the metric associated with the second set of pilot resource elements.

In some examples, the metric includes a percentile peak value.

Figure 8:
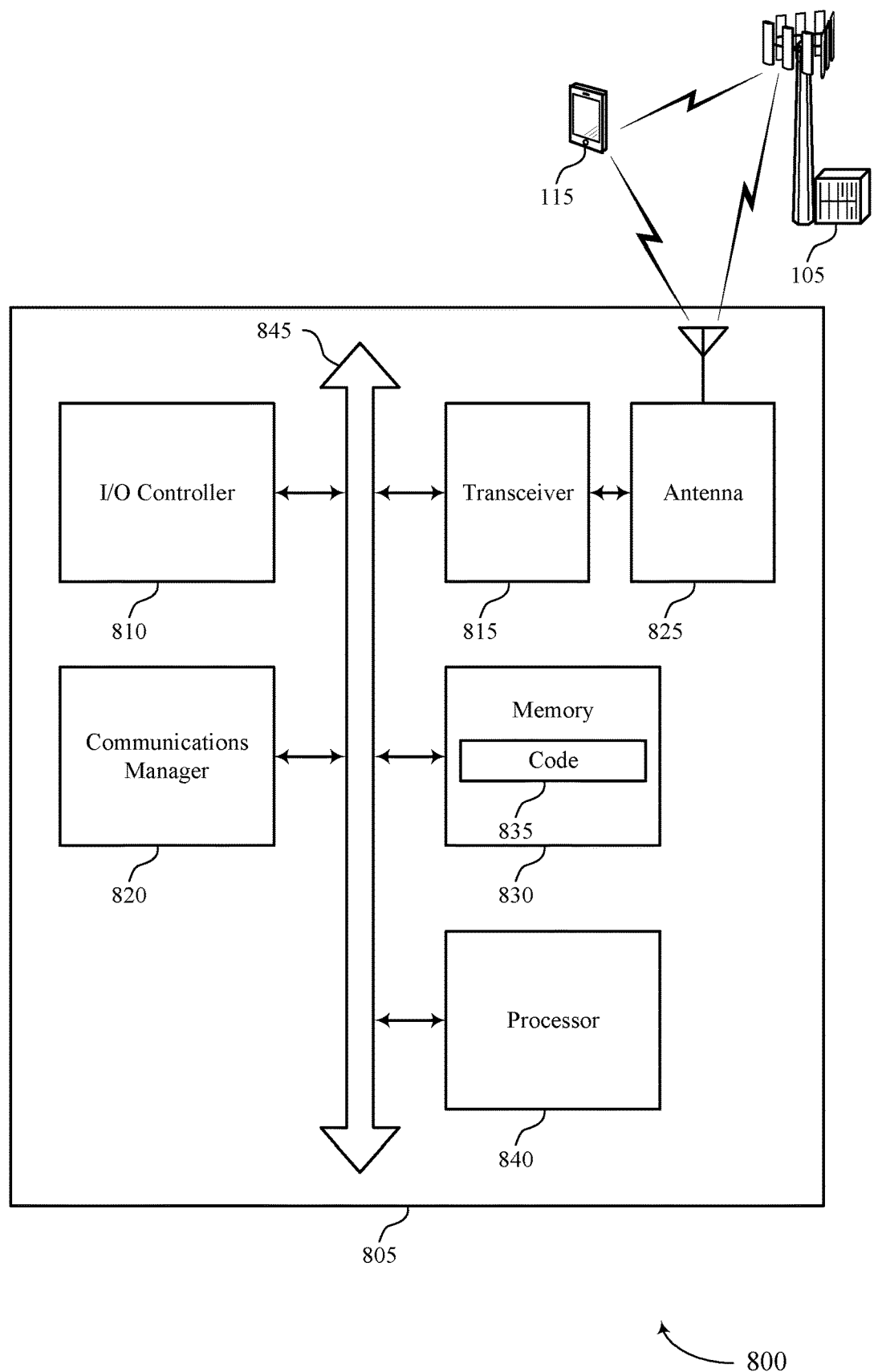
FIG. 8 shows a diagram of a system including a device that supports enhanced demodulation reference signal for digital post distortion assist in accordance with aspects of the present disclosure.

FIG. 8 shows a diagram of a system 800 including a device 805 that supports enhanced demodulation reference signal for digital post distortion assist in accordance with aspects of the present disclosure. The device 805 may be an example of or include the components of a device 505, a device 605, a UE 115, a base station 105, or a first device 205 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced demodulation reference signal for digital post distortion assist). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for identifying a set of data resource elements for transmitting data in one or more symbol periods. The communications manager 820 may be configured as or otherwise support a means for generating, for the one or more symbol periods basing at least in part on the set of data resource elements, a sequence of a set of pilot resource elements associated with the set of data resource elements, the sequence of the set of pilot resource elements including a demodulation reference signal. The communications manager 820 may be configured as or otherwise support a means for transmitting, to a second wireless device in the one or more symbol periods, the set of data resource elements and the set of pilot resource elements associated with the set of data resource elements.

By including or configuring the communications manager 820 in accordance with examples as described herein, the device 805 may support techniques for the device 805 to compensate for transmission non-linearities induced by the PA of a device receiving the set of data resource elements and the set of pilot resource elements. Additionally or alternatively, the techniques described herein may lower a probability that PA mismatch may occur, may enable the device 805 to use a smaller PA backoff, may increase a range of communications, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhanced demodulation reference signal for digital post distortion assist as described herein, or the processor 840 and the memory 830 may be otherwise configured to perform or support such operations.

Figure 9:
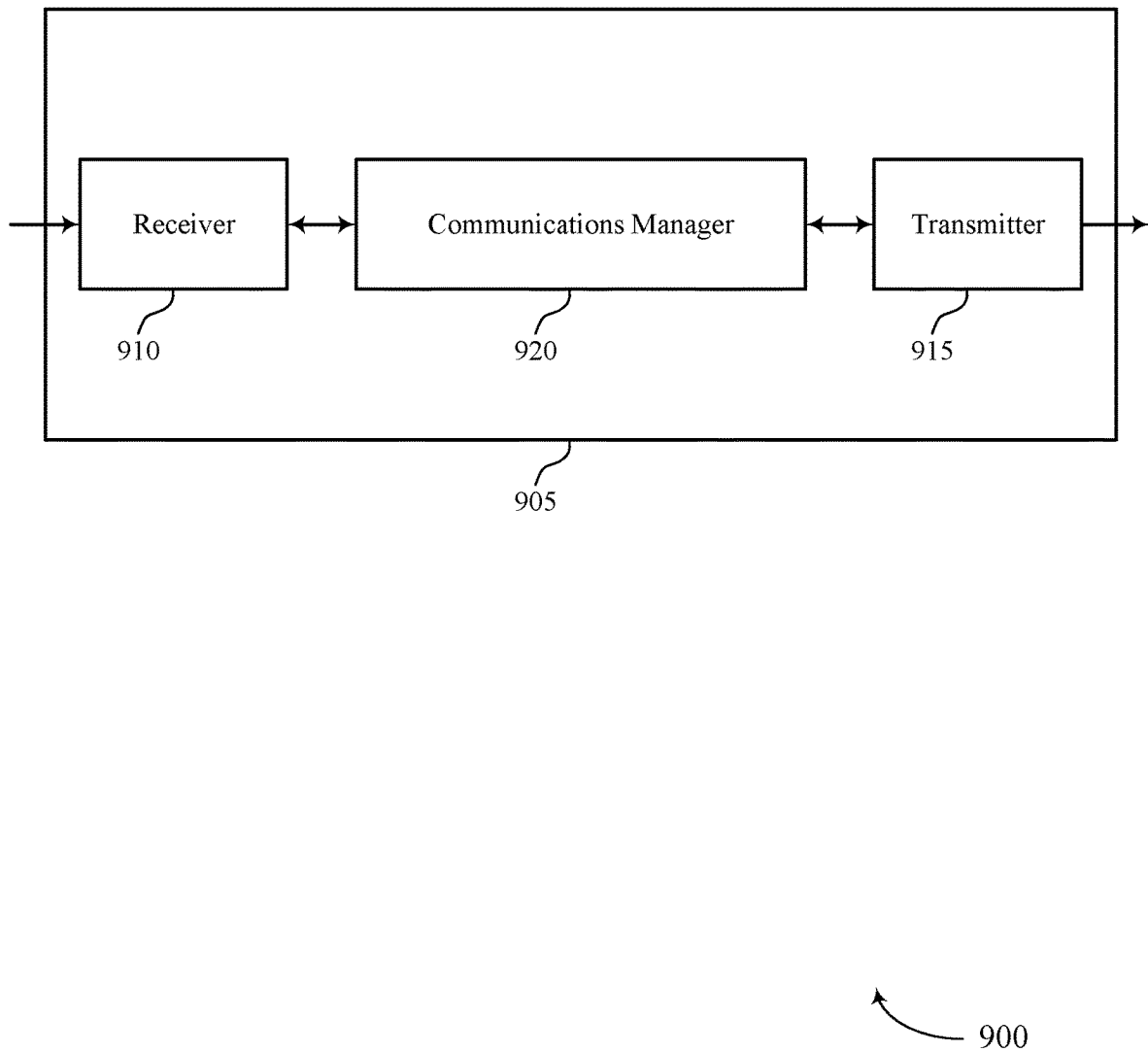
FIGS. 9 and 10 show block diagrams of devices that support enhanced demodulation reference signal for digital post distortion assist in accordance with aspects of the present disclosure.

FIG. 9 shows a block diagram 900 of a device 905 that supports enhanced demodulation reference signal for digital post distortion assist in accordance with aspects of the present disclosure. The device 905 may be an example of aspects of a base station 105, a UE 115, or a second device 210 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to enhanced demodulation reference signal for digital post distortion assist). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to enhanced demodulation reference signal for digital post distortion assist). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of enhanced demodulation reference signal for digital post distortion assist as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second wireless device in accordance with examples as disclosed herein. For example, the communications manager 920 may be configured as or otherwise support a means for receiving, from a first wireless device in one or more symbol periods, a set of data resource elements and a set of pilot resource elements including a demodulation reference signal associated with the set of data resource elements. The communications manager 920 may be configured as or otherwise support a means for decoding a first subset of the set of pilot resource elements based on a second subset of the set of pilot resource elements to determine the demodulation reference signal that is associated with the set of data resource elements. The communications manager 920 may be configured as or otherwise support a means for performing a digital post distortion procedure for the received set of data resource elements based on the determined demodulation reference signal.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the device 905 to increase a range of communications with a wireless device from which the set of pilot resource elements and/or the set of data resource elements are received. Additionally, decoding the first subset based on the second subset to determine the DMRS may enable the set of pilot resource elements to have a non-linearity closer to the non-linearity of the set of data resource elements or to a set of PTRS resource elements, which may increase the efficacy of DPoD.

Figure 10:
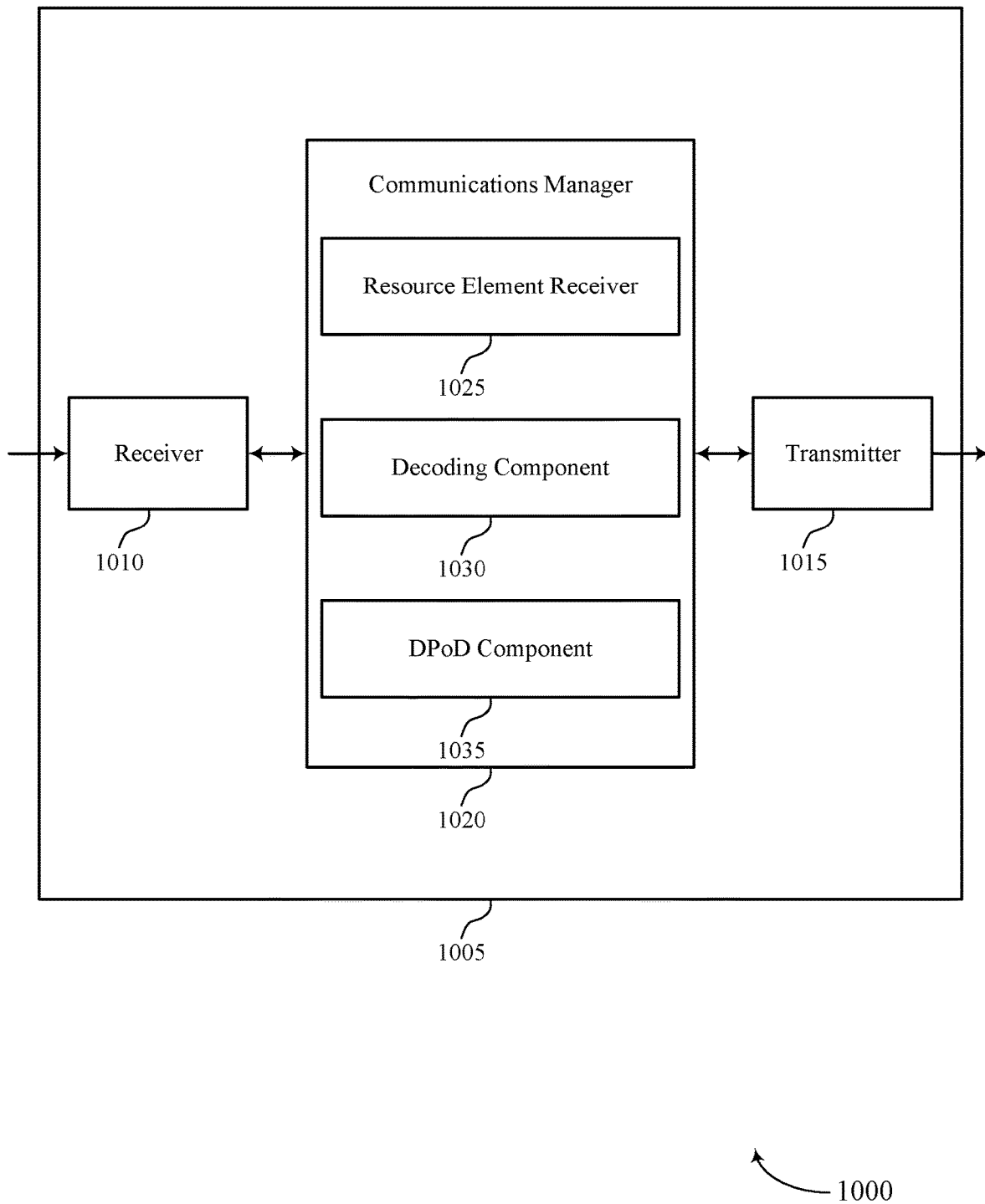

FIG. 10 shows a block diagram 1000 of a device 1005 that supports enhanced demodulation reference signal for digital post distortion assist in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to enhanced demodulation reference signal for digital post distortion assist). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to enhanced demodulation reference signal for digital post distortion assist). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of enhanced demodulation reference signal for digital post distortion assist as described herein. For example, the communications manager 1020 may include a resource element receiver 1025, a decoding component 1030, a DPoD component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second wireless device in accordance with examples as disclosed herein. The resource element receiver 1025 may be configured as or otherwise support a means for receiving, from a first wireless device in one or more symbol periods, a set of data resource elements and a set of pilot resource elements including a demodulation reference signal associated with the set of data resource elements. The decoding component 1030 may be configured as or otherwise support a means for decoding a first subset of the set of pilot resource elements based on a second subset of the set of pilot resource elements to determine the demodulation reference signal that is associated with the set of data resource elements. The DPoD component 1035 may be configured as or otherwise support a means for performing a digital post distortion procedure for the received set of data resource elements based on the determined demodulation reference signal.

Figure 11:
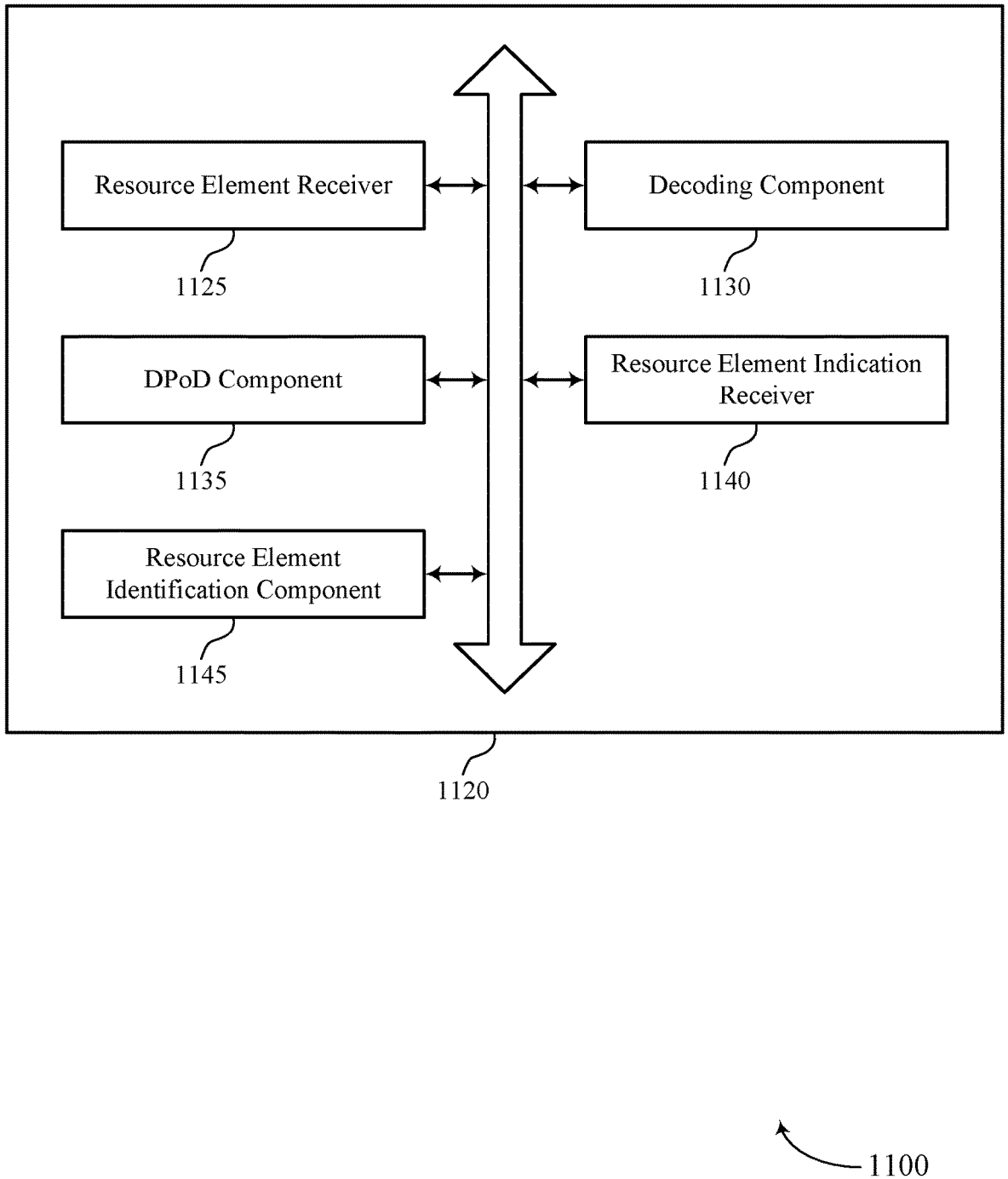
FIG. 11 shows a block diagram of a communications manager that supports enhanced demodulation reference signal for digital post distortion assist in accordance with aspects of the present disclosure.

FIG. 11 shows a block diagram 1100 of a communications manager 1120 that supports enhanced demodulation reference signal for digital post distortion assist in accordance with aspects of the present disclosure. The communications manager 1120 may be an example of aspects of a communications manager 920, a communications manager 1020, or both, as described herein. The communications manager 1120, or various components thereof, may be an example of means for performing various aspects of enhanced demodulation reference signal for digital post distortion assist as described herein. For example, the communications manager 1120 may include a resource element receiver 1125, a decoding component 1130, a DPoD component 1135, a resource element indication receiver 1140, a resource element identification component 1145, or any combination thereof. Each of these components may communicate, directly or indirectly, with one another (e.g., via one or more buses).

The communications manager 1120 may support wireless communication at a second wireless device in accordance with examples as disclosed herein. The resource element receiver 1125 may be configured as or otherwise support a means for receiving, from a first wireless device in one or more symbol periods, a set of data resource elements and a set of pilot resource elements including a demodulation reference signal associated with the set of data resource elements. The decoding component 1130 may be configured as or otherwise support a means for decoding a first subset of the set of pilot resource elements based on a second subset of the set of pilot resource elements to determine the demodulation reference signal that is associated with the set of data resource elements. The DPoD component 1135 may be configured as or otherwise support a means for performing a digital post distortion procedure for the received set of data resource elements based on the determined demodulation reference signal.

In some examples, each pilot resource element of the set of pilot resource elements is modulated according to a quadrature phase shift keying.

In some examples, the resource element indication receiver 1140 may be configured as or otherwise support a means for receiving, from the first wireless device, an indication of a configuration of the set of pilot resource elements, where receiving the set of pilot resource elements is based on the indicated configuration of the set of pilot resource elements.

In some examples, the resource element identification component 1145 may be configured as or otherwise support a means for identifying a first subset of the set of pilot resource elements that excludes a second subset of the set of pilot resource elements, where decoding the second subset of the set of pilot resource elements is based on identifying the first subset of the set of pilot resource elements.

In some examples, receiving the set of pilot resource elements is based on the set of pilot resource elements being associated with a metric that satisfies a threshold.

In some examples, the metric includes a percentile peak value and. In some examples, the metric satisfying the threshold includes the percentile peak value being above the threshold.

Figure 12:
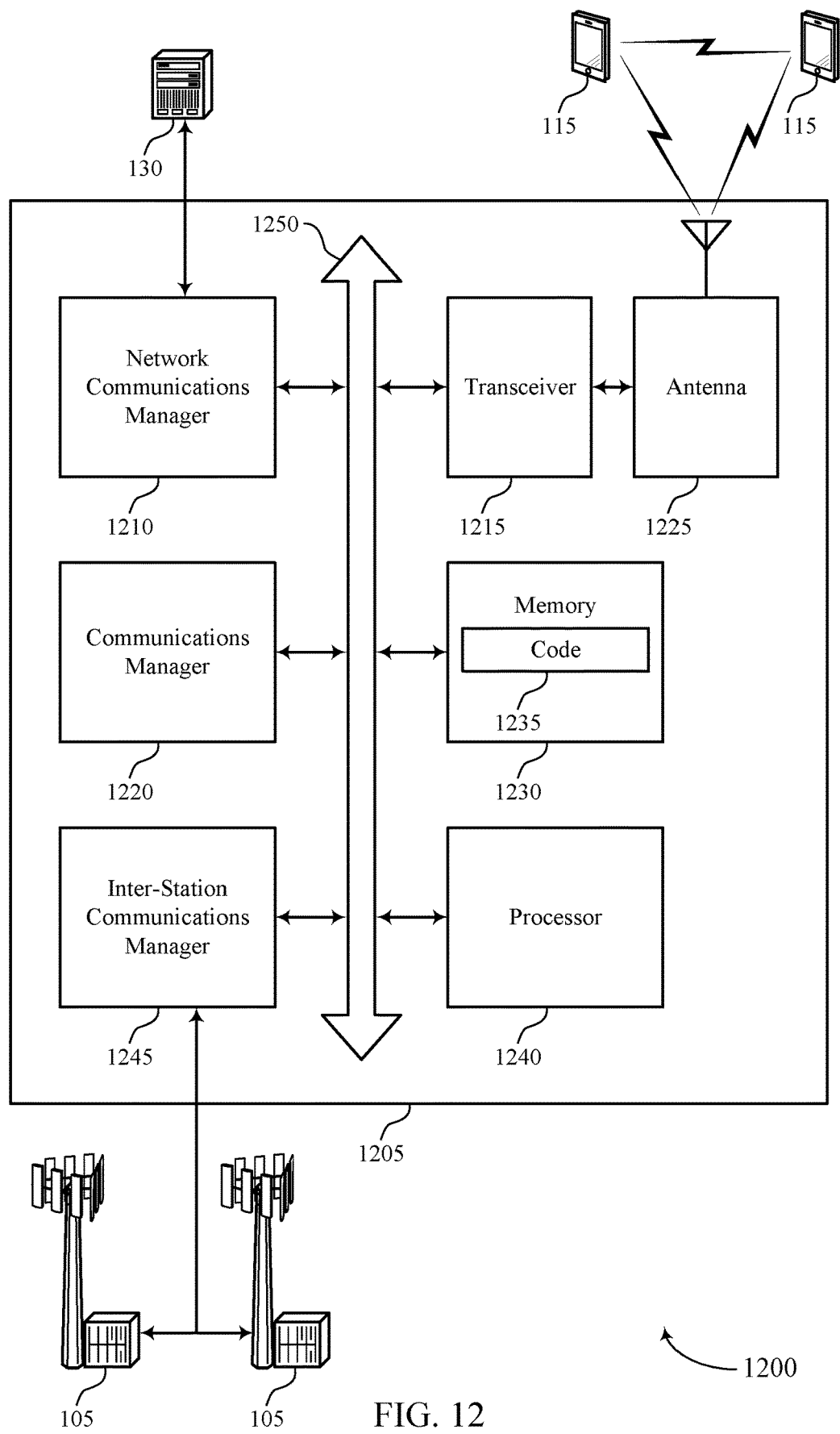
FIG. 12 shows a diagram of a system including a device that supports enhanced demodulation reference signal for digital post distortion assist in accordance with aspects of the present disclosure.

FIG. 12 shows a diagram of a system 1200 including a device 1205 that supports enhanced demodulation reference signal for digital post distortion assist in accordance with aspects of the present disclosure. The device 1205 may be an example of or include the components of a device 905, a device 1005, a base station 105, a UE 115, or a second device 210 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting enhanced demodulation reference signal for digital post distortion assist). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a second wireless device in accordance with examples as disclosed herein. For example, the communications manager 1220 may be configured as or otherwise support a means for receiving, from a first wireless device in one or more symbol periods, a set of data resource elements and a set of pilot resource elements including a demodulation reference signal associated with the set of data resource elements. The communications manager 1220 may be configured as or otherwise support a means for decoding a first subset of the set of pilot resource elements based on a second subset of the set of pilot resource elements to determine the demodulation reference signal that is associated with the set of data resource elements. The communications manager 1220 may be configured as or otherwise support a means for performing a digital post distortion procedure for the received set of data resource elements based on the determined demodulation reference signal.

By including or configuring the communications manager 1220 in accordance with examples as described herein, the device 1205 may support techniques for the device 1205 to increase a range of communications with a wireless device from which the set of pilot resource elements and/or the set of data resource elements are received. Additionally, decoding the first subset based on the second subset to determine the DMRS may enable the set of pilot resource elements to have a non-linearity closer to the non-linearity of the set of data resource elements or to a set of PTRS resource elements, which may increase the efficacy of DPoD.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of enhanced demodulation reference signal for digital post distortion assist as described herein, or the processor 1240 and the memory 1230 may be otherwise configured to perform or support such operations.

Figure 13:
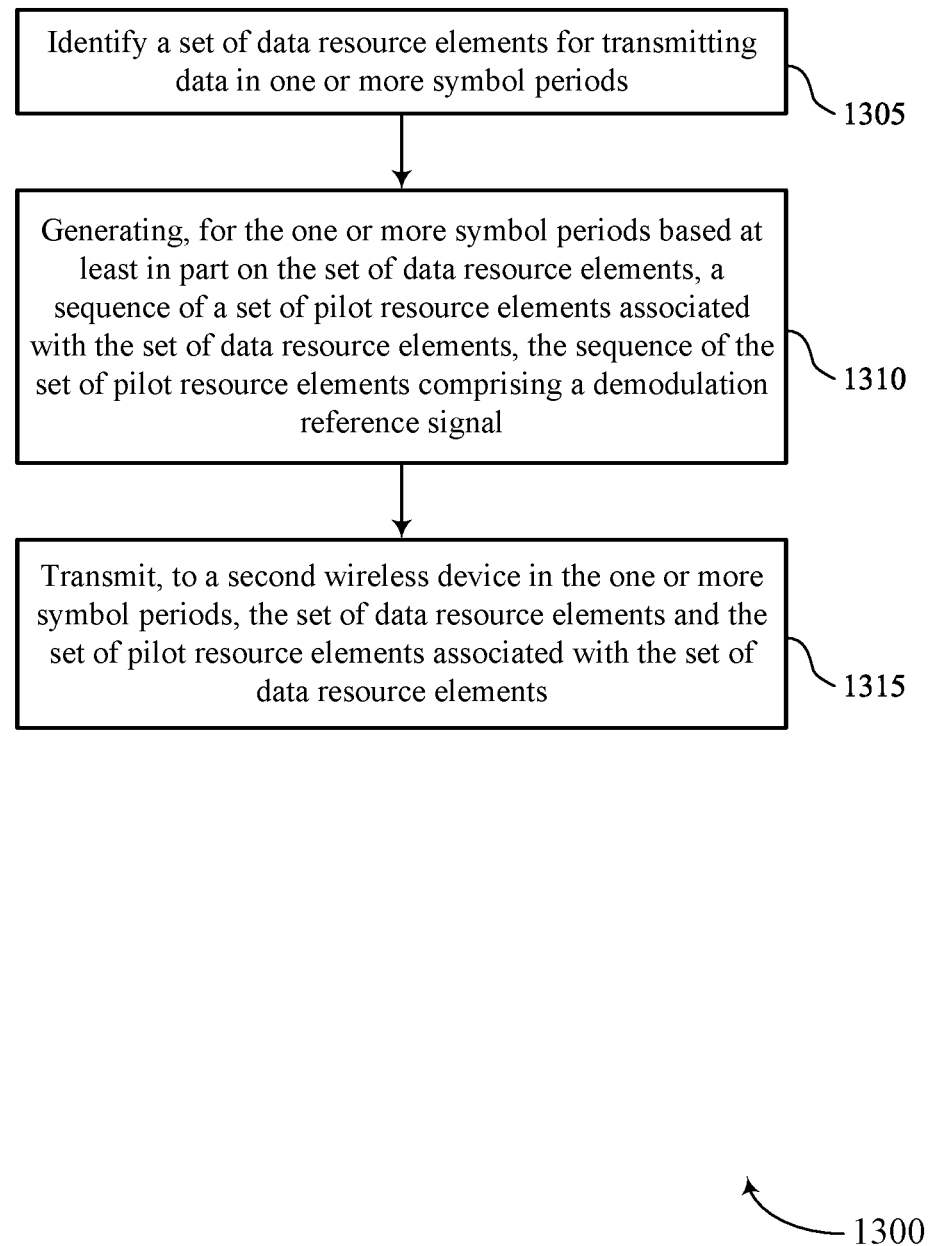
FIGS. 13 through 16 show flowcharts illustrating methods that support enhanced demodulation reference signal for digital post distortion assist in accordance with aspects of the present disclosure.

FIG. 13 shows a flowchart illustrating a method 1300 that supports enhanced demodulation reference signal for digital post distortion assist in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include identifying a set of data resource elements for transmitting data in one or more symbol periods. The operations of 1305 may be performed in accordance with examples as disclosed herein. In some examples, aspects of the operations of 1305 may be performed by a data identifier 725 as described with reference to FIG. 7.

At 1310, the method may include generating, for the one or more symbol periods based on the set of data resource elements, a sequence of a set of pilot resource elements associated with the set of data resource elements, the sequence of the set of pilot resource elements including a demodulation reference signal. The operations of 1310 may be performed in accordance with examples as disclosed herein. In some examples, aspects of the operations of 1310 may be performed by a sequence generator 730 as described with reference to FIG. 7.

At 1315, the method may include transmitting, to a second wireless device in the one or more symbol periods, the set of data resource elements and the set of pilot resource elements associated with the set of data resource elements. The operations of 1315 may be performed in accordance with examples as disclosed herein. In some examples, aspects of the operations of 1315 may be performed by a resource element transmitter 735 as described with reference to FIG. 7.

Figure 14:
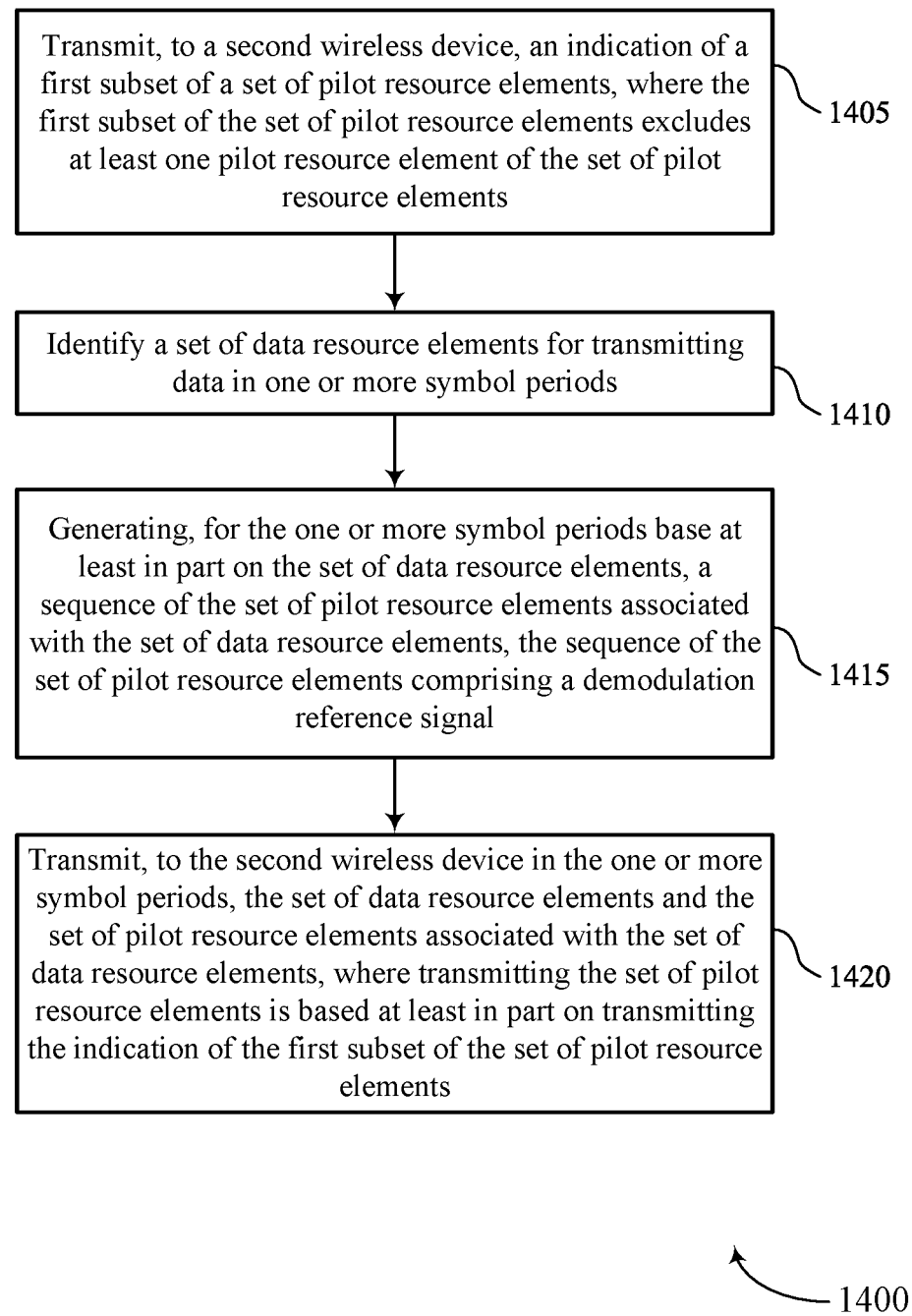

FIG. 14 shows a flowchart illustrating a method 1400 that supports enhanced demodulation reference signal for digital post distortion assist in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a second wireless device, an indication of a first subset of a set of pilot resource elements, where the first subset of the set of pilot resource elements excludes at least one pilot resource element of the set of pilot resource elements. The operations of 1405 may be performed in accordance with examples as disclosed herein. In some examples, aspects of the operations of 1405 may be performed by a resource element indication transmitter 740 as described with reference to FIG. 7.

At 1410, the method may include identifying a set of data resource elements for transmitting data in one or more symbol periods. The operations of 1410 may be performed in accordance with examples as disclosed herein. In some examples, aspects of the operations of 1410 may be performed by a data identifier 725 as described with reference to FIG. 7.

At 1415, the method may include generating, for the one or more symbol periods based at least in part on the set of data resource elements, a sequence of the set of pilot resource elements associated with the set of data resource elements, the sequence of the set of pilot resource elements comprising a demodulation reference signal. The operations of 1415 may be performed in accordance with examples as disclosed herein. In some examples, aspects of the operations of 1415 may be performed by a sequence generator 730 as described with reference to FIG. 7.

At 1420, the method may include transmitting, to the second wireless device in the one or more symbol periods, the set of data resource elements and the set of pilot resource elements associated with the set of data resource elements, where transmitting the set of pilot resource elements is based at least in part on transmitting the indication of the first subset of the set of pilot resource elements. The operations of 1420 may be performed in accordance with examples as disclosed herein. In some examples, aspects of the operations of 1420 may be performed by a resource element transmitter 735 as described with reference to FIG. 7.

Figure 15:
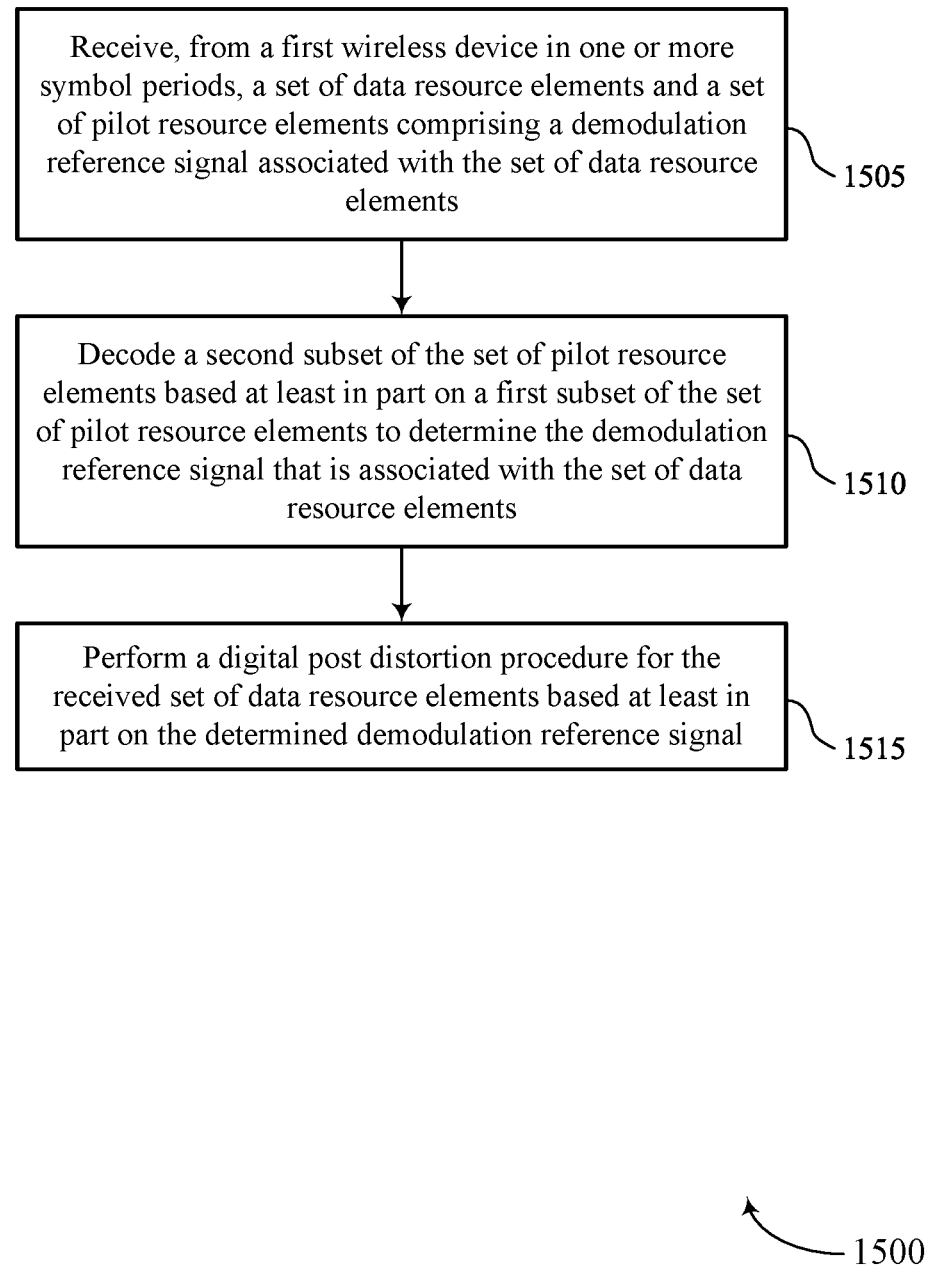

FIG. 15 shows a flowchart illustrating a method 1500 that supports enhanced demodulation reference signal for digital post distortion assist in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a first wireless device in one or more symbol periods, a set of data resource elements and a set of pilot resource elements including a demodulation reference signal associated with the set of data resource elements. The operations of 1505 may be performed in accordance with examples as disclosed herein. In some examples, aspects of the operations of 1505 may be performed by a resource element receiver 1125 as described with reference to FIG. 11.

At 1510, the method may include decoding a second subset of the set of pilot resource elements based on a first subset of the set of pilot resource elements to determine the demodulation reference signal that is associated with the set of data resource elements. The operations of 1510 may be performed in accordance with examples as disclosed herein. In some examples, aspects of the operations of 1510 may be performed by a decoding component 1130 as described with reference to FIG. 11.

At 1515, the method may include performing a digital post distortion procedure for the received set of data resource elements based on the determined demodulation reference signal. The operations of 1515 may be performed in accordance with examples as disclosed herein. In some examples, aspects of the operations of 1515 may be performed by a DPoD component 1135 as described with reference to FIG. 11.

Figure 16:
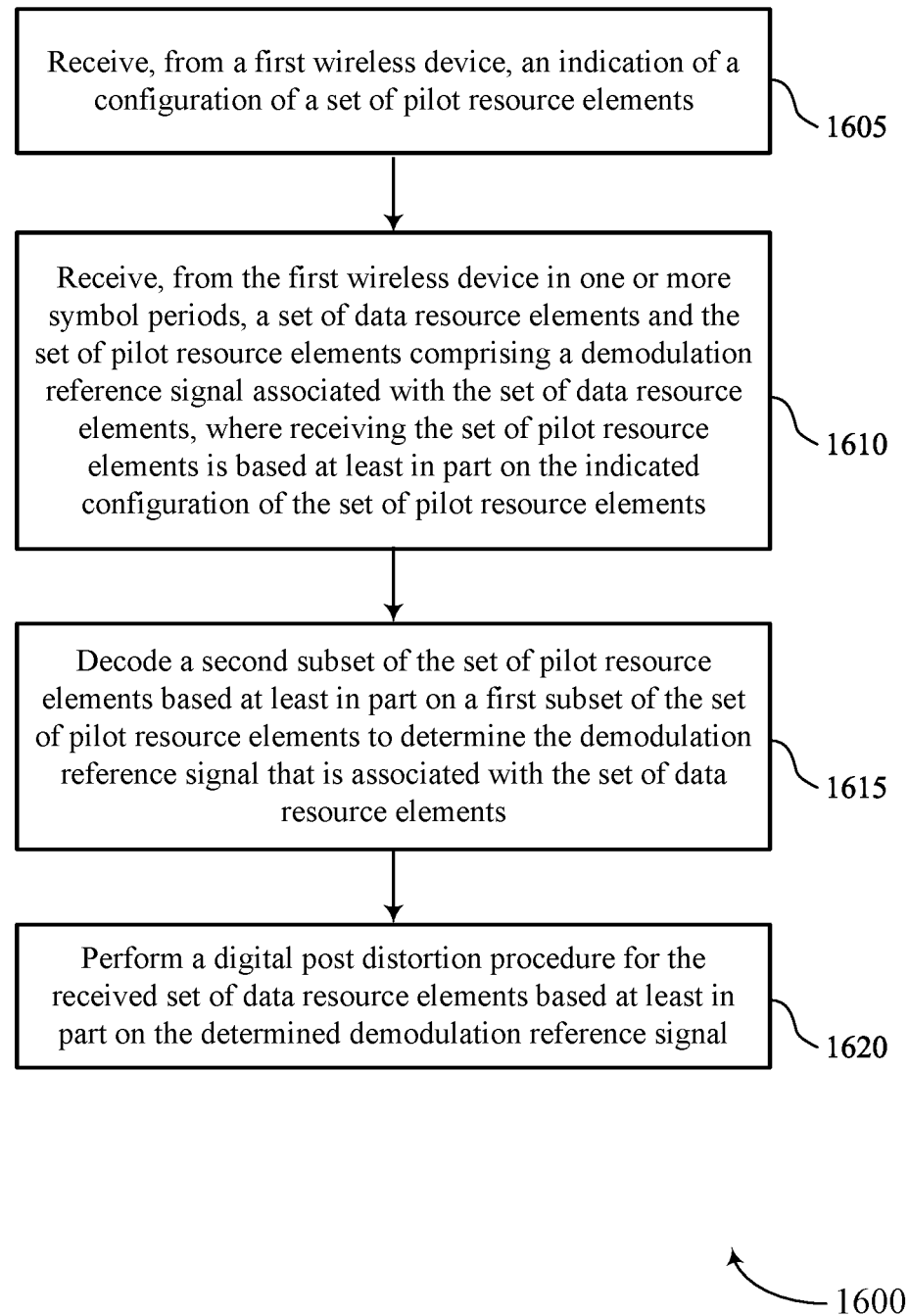

FIG. 16 shows a flowchart illustrating a method 1600 that supports enhanced demodulation reference signal for digital post distortion assist in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a first wireless device, an indication of a configuration of a set of pilot resource elements. The operations of 1605 may be performed in accordance with examples as disclosed herein. In some examples, aspects of the operations of 1605 may be performed by a resource element indication receiver 1140 as described with reference to FIG. 11.

At 1610, the method may include receiving, from the first wireless device in one or more symbol periods, a set of data resource elements and the set of pilot resource elements comprising a demodulation reference signal associated with the set of data resource elements, where receiving the set of pilot resource elements is based at least in part on the indicated configuration of the set of pilot resource elements. The operations of 1610 may be performed in accordance with examples as disclosed herein. In some examples, aspects of the operations of 1610 may be performed by a resource element receiver 1125 as described with reference to FIG. 11.

At 1615, the method may include decoding a second subset of the set of pilot resource elements based at least in part on a first subset of the set of pilot resource elements to determine the demodulation reference signal that is associated with the set of data resource elements. The operations of 1615 may be performed in accordance with examples as disclosed herein. In some examples, aspects of the operations of 1615 may be performed by a decoding component 1130 as described with reference to FIG. 11.

At 1620, the method may include performing a digital post distortion procedure for the received set of data resource elements based at least in part on the determined demodulation reference signal. The operations of 1620 may be performed in accordance with examples as disclosed herein. In some examples, aspects of the operations of 1620 may be performed by a DPoD component 1135 as described with reference to FIG. 11.

The following provides an overview of aspects of the present disclosure:

Aspect 1: A method for wireless communication at a first wireless device, comprising: identifying a set of data resource elements for transmitting data in one or more symbol periods; generating, for the one or more symbol periods based at least in part on the set of data resource elements, a sequence of a set of pilot resource elements associated with the set of data resource elements, the sequence of the set of pilot resource elements comprising a demodulation reference signal; and transmitting, to a second wireless device in the one or more symbol periods, the set of data resource elements and the set of pilot resource elements associated with the set of data resource elements.

Aspect 2: The method of aspect 1, further comprising: transmitting, to the second wireless device, an indication of a first subset of the set of pilot resource elements, wherein the first subset of the set of pilot resource elements excludes at least one pilot resource element of the set of pilot resource elements, and wherein transmitting the set of pilot resource elements is based at least in part on transmitting the indication of the first subset of the set of pilot resource elements.

Aspect 3: The method of aspect 2, wherein the transmitting of the indication of the first subset of the set of pilot resource elements comprises: transmitting configuration signaling identifying the first subset of the set of pilot resource elements.

Aspect 4: The method of aspect 3, wherein transmitting the configuration signaling identifying the first subset of the set of pilot resource elements comprises: transmitting a demodulation reference signal configuration identifying the first subset of the set of pilot resource elements.

Aspect 5: The method of any of aspects 1 through 4, further comprising: identifying a first subset of the set of pilot resource elements that excludes a second subset of the set of pilot resource elements, wherein transmitting the set of pilot resource elements is based at least in part on identifying the first subset of the set of pilot resource elements.

Aspect 6: The method of any of aspects 1 through 5, wherein generating the sequence comprises: selecting the sequence from a set of sequences, wherein transmitting the set of pilot resource elements is based at least in part on selecting the sequence from the set of sequences.

Aspect 7: The method of aspect 6, wherein the sequence is selected from the set of sequences based at least in part on a metric for the sequence satisfying a threshold.

Aspect 8: The method of aspect 7, wherein the metric comprises a percentile peak value and satisfying the threshold comprises the percentile peak value being above the threshold Aspect 9: The method of any of aspects 6 through 8, wherein each sequence of the set of candidate sequences has an associated value of a metric, and the sequence is selected from the set of sequences based at least in part on the associated value of the metric of the sequence having a lowest value or a highest value relative to the value of the metric for each other sequence of the set of candidate sequences Aspect 10: The method of any of aspects 1 through 9, further comprising: modulating each pilot resource element of the set of pilot resource elements using quadrature phase shift keying, wherein transmitting the set of pilot resource elements is based at least in part on the modulating.

Aspect 11: The method of any of aspects 1 through 10, further comprising: identifying a set of constellation points associated with a pilot resource element of the set of pilot resource elements; determining a value of a metric for the pilot resource element for each constellation point of the set of constellation points; and selecting, for the pilot resource element, a constellation point of the set of constellation points based at least in part on determining the value of the metric for each constellation point of the set of constellation points, wherein transmitting the set of pilot resource elements is based at least in part on selecting the constellation point.

Aspect 12: The method of aspect 11, further comprising: identifying a second set of constellation points associated with a second pilot resource element of the set of pilot resource elements; determining a second value of the metric for the second pilot resource element for each constellation point of the second set of constellation points; and selecting, for the second pilot resource element, a second constellation point of the second set of constellation points based at least in part on determining the second value of the metric for each constellation point of the second set of constellation points, wherein transmitting the set of pilot resource elements is based at least in part on selecting the second constellation point.

Aspect 13: The method of aspect 12, further comprising: identifying a first subset of the set of pilot resource elements that excludes a second subset of the set of pilot resource elements, wherein the second subset of the set of pilot resource elements comprises the first pilot resource element and the second pilot resource element.

Aspect 14: The method of aspect 13, further comprising: selecting, for each pilot resource element of the second subset of the set of pilot resource elements, a respective constellation point of a respective set of constellation points based at least in part on determining a respective value of the metric for each constellation point of the respective set of constellation points, wherein transmitting the set of pilot resource elements is based at least in part on selecting the respective constellation point for each pilot resource element of the second subset of the set of pilot resource elements.

Aspect 15: The method of aspect 14, further comprising: refraining from determining a respective value of the metric for each pilot resource element of the first subset of the set of pilot resource elements, wherein transmitting the set of pilot resource elements is based at least in part on the refraining.

Aspect 16: The method of any of aspects 11 through 15, wherein the metric comprises a percentile peak, and wherein selecting the constellation point comprises: determining, for each constellation point of the set of constellation points, a percentile peak value over a symbol period that overlaps in time with the first pilot resource element; and selecting a first constellation point of the set of constellation points associated with a higher percentile peak value than that of a second constellation point of the set of constellation points.

Aspect 17: The method of aspect 16, wherein the first constellation point is associated with a highest percentile peak of each constellation point in the set of constellation points.

Aspect 18: The method of any of aspects 1 through 17, further comprising: identifying a number of constellation points associated with performing quadrature amplitude modulation on a data resource element of the set of data resource elements, wherein generating the sequence is based at least in part on the number of constellation points being above a threshold.

Aspect 19: The method of any of aspects 1 through 18, wherein generating the sequence comprises: identifying a set of constellation points for each pilot resource element of the set of pilot resource elements; generating a plurality of sequences of constellation points, wherein each sequence of constellation points comprises one constellation point from each set of constellation points for the set of pilot resource elements; determining, for each sequence of constellation points of the plurality, a value of a metric; and selecting, for the set of pilot resource elements, a sequence of constellation points from the plurality based at least in part on determining the value of the metric for each constellation point of the set of constellation points, wherein transmitting the set of pilot resource elements is based at least in part on selecting the sequence of constellation points.

Aspect 20: The method of any of aspects 1 through 19, wherein the metric comprises a percentile peak value.

Aspect 21: A method for wireless communication at a second wireless device, comprising: receiving, from a first wireless device in one or more symbol periods, a set of data resource elements and a set of pilot resource elements comprising a demodulation reference signal associated with the set of data resource elements; decoding a second subset of the set of pilot resource elements based at least in part on a first subset of the set of pilot resource elements to determine the demodulation reference signal that is associated with the set of data resource elements; and performing a digital post distortion procedure for the received set of data resource elements based at least in part on the determined demodulation reference signal.

Aspect 22: The method of aspect 21, wherein each pilot resource element of the set of pilot resource elements is modulated according to a quadrature phase shift keying.

Aspect 23: The method of any of aspects 21 through 22, further comprising: receiving, from the first wireless device, an indication of a configuration of the set of pilot resource elements, wherein receiving the set of pilot resource elements is based at least in part on the indicated configuration of the set of pilot resource elements.

Aspect 24: The method of any of aspects 21 through 23, further comprising: identifying the first subset of the set of pilot resource elements that excludes the second subset of the set of pilot resource elements, wherein decoding the second subset of the set of pilot resource elements is based at least in part on identifying the first subset of the set of pilot resource elements.

Aspect 25: The method of any of aspects 21 through 24, wherein receiving the set of pilot resource elements is based at least in part on the set of pilot resource elements being associated with a metric that satisfies a threshold.

Aspect 26: The method of aspect 25, wherein the metric comprises a percentile peak value and the metric satisfying the threshold comprises the percentile peak value being above the threshold Aspect 27: An apparatus for wireless communication at a first wireless device, comprising a processor; memory coupled with the processor; and instructions stored in the memory and executable by the processor to cause the apparatus to perform a method of any of aspects 1 through 20.

Aspect 28: An apparatus for wireless communication at a first wireless device, comprising at least one means for performing a method of any of aspects 1 through 20.

Aspect 29: A non-transitory computer-readable medium storing code for wireless communication at a first wireless device, the code comprising instructions executable by a processor to perform a method of any of aspects 1 through 20.

Aspect 30: An apparatus for wireless communication at a second wireless device, comprising a processor; memory coupled with the processor; and instructions stored in the memory and executable by the processor to cause the apparatus to perform a method of any of aspects 21 through 26.

Aspect 31: An apparatus for wireless communication at a second wireless device, comprising at least one means for performing a method of any of aspects 21 through 26.

Aspect 32: A non-transitory computer-readable medium storing code for wireless communication at a second wireless device, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   identifying a set of data resource elements for transmitting data in one or more symbol periods;
   selecting, for the one or more symbol periods based at least in part on the set of data resource elements, a sequence of a set of pilot resource elements associated with the set of data resource elements from a set of sequences, the sequence of the set of pilot resource elements comprising a demodulation reference signal; and
   transmitting, to a second wireless device in the one or more symbol periods, the set of data resource elements and the set of pilot resource elements associated with the set of data resource elements, wherein transmitting the set of pilot resource elements is based at least in part on selecting the sequence from the set of sequences.

2. The method of claim 1, further comprising:
   transmitting, to the second wireless device, an indication of a first subset of the set of pilot resource elements, wherein the first subset of the set of pilot resource elements excludes at least one pilot resource element of the set of pilot resource elements, and wherein transmitting the set of pilot resource elements is based at least in part on transmitting the indication of the first subset of the set of pilot resource elements.

3. The method of claim 2, wherein the transmitting of the indication of the first subset of the set of pilot resource elements comprises:
   transmitting configuration signaling identifying the first subset of the set of pilot resource elements.

4. The method of claim 3, wherein transmitting the configuration signaling identifying the first subset of the set of pilot resource elements comprises:
   transmitting a demodulation reference signal configuration identifying the first subset of the set of pilot resource elements.

5. The method of claim 1, further comprising:
   identifying a first subset of the set of pilot resource elements that excludes a second subset of the set of pilot resource elements, wherein transmitting the set of pilot resource elements is based at least in part on identifying the first subset of the set of pilot resource elements.

6. The method of claim 1, wherein
   each sequence of the set of sequences has an associated value of a metric, and
   the sequence is selected from the set of sequences based at least in part on the associated value of the metric of the sequence having a lowest value or a highest value relative to the value of the metric for each other sequence of the set of sequences.

7. The method of claim 1, wherein the sequence is selected from the set of sequences based at least in part on a metric for the sequence satisfying a threshold.

8. The method of claim 7, wherein
   the metric comprises a percentile peak value and the metric satisfying the threshold comprises the percentile peak value being above the threshold.

9. The method of claim 1, further comprising:
   identifying a number of constellation points associated with performing quadrature amplitude modulation on a data resource element of the set of data resource elements, wherein generating the sequence is based at least in part on the number of constellation points being above a threshold.

10. The method of claim 1, further comprising:
    modulating each pilot resource element of the set of pilot resource elements using quadrature phase shift keying, wherein transmitting the set of pilot resource elements is based at least in part on the modulating.

11. The method of claim 1, further comprising:
    identifying a set of constellation points associated with a pilot resource element of the set of pilot resource elements;
    determining a value of a metric for the pilot resource element for each constellation point of the set of constellation points; and
    selecting, for the pilot resource element, a constellation point of the set of constellation points based at least in part on determining the value of the metric for each constellation point of the set of constellation points, wherein transmitting the set of pilot resource elements is based at least in part on selecting the constellation point.

12. The method of claim 11, further comprising:
identifying a second set of constellation points associated with a second pilot resource element of the set of pilot resource elements;
determining a second value of the metric for the second pilot resource element for each constellation point of the second set of constellation points; and
selecting, for the second pilot resource element, a second constellation point of the second set of constellation points based at least in part on determining the second value of the metric for each constellation point of the second set of constellation points, wherein transmitting the set of pilot resource elements is based at least in part on selecting the second constellation point.

13. The method of claim 12, further comprising:
identifying a first subset of the set of pilot resource elements that excludes a second subset of the set of pilot resource elements, wherein the second subset of the set of pilot resource elements comprises the pilot resource element.

14. The method of claim 13, further comprising:
selecting, for each pilot resource element of the second subset of the set of pilot resource elements, a respective constellation point of a respective set of constellation points based at least in part on determining a respective value of the metric for each constellation point of the respective set of constellation points, wherein transmitting the set of pilot resource elements is based at least in part on selecting the respective constellation point for each pilot resource element of the second subset of the set of pilot resource elements.

15. The method of claim 14, further comprising:
refraining from determining a respective value of the metric for each pilot resource element of the first subset of the set of pilot resource elements, wherein transmitting the set of pilot resource elements is based at least in part on the refraining.

16. The method of claim 11, wherein
the metric comprises a percentile peak, and wherein selecting the constellation point comprises:
determining, for each constellation point of the set of constellation points, a percentile peak value over a symbol period that overlaps in time with the pilot resource element; and
selecting a first constellation point of the set of constellation points associated with a higher percentile peak value than that of a second constellation point of the set of constellation points.

17. The method of claim 16, wherein the first constellation point is associated with a highest percentile peak of each constellation point in the set of constellation points.

18. The method of claim 1, wherein generating the sequence comprises:
identifying a set of constellation points for each pilot resource element of the set of pilot resource elements;
generating a plurality of sequences of constellation points, wherein each sequence of constellation points comprises one constellation point from each set of constellation points for the set of pilot resource elements;
determining, for each sequence of constellation points of the plurality, a value of a metric; and
selecting, for the set of pilot resource elements, a sequence of constellation points from the plurality based at least in part on determining the value of the metric for each constellation point of the set of constellation points, wherein transmitting the set of pilot resource elements is based at least in part on selecting the sequence of constellation points.

19. The method of claim 18, wherein the metric comprises a percentile peak value.

20. An apparatus for wireless communication at a second wireless device, comprising:
a processor;
memory coupled with the processor; and
instructions stored in the memory and executable by the processor to cause the apparatus to:
receive, from a first wireless device, an indication of a configuration of a set of pilot resource elements;
receive, from the first wireless device in one or more symbol periods, a set of data resource elements and the set of pilot resource elements comprising a demodulation reference signal associated with the set of data resource elements, wherein receiving the set of pilot resource elements is based at least in part on the indicated configuration of the set of pilot resource elements;
decode a second subset of the set of pilot resource elements based at least in part on a first subset of the set of pilot resource elements to determine the demodulation reference signal that is associated with the set of data resource elements; and
perform a digital post distortion procedure for the received set of data resource elements based at least in part on the determined demodulation reference signal.

21. A method for wireless communication at a second wireless device, comprising:
receiving, from a first wireless device, an indication of a configuration of a set of pilot resource elements;
receiving, from the first wireless device in one or more symbol periods, a set of data resource elements and the set of pilot resource elements comprising a demodulation reference signal associated with the set of data resource elements, wherein receiving the set of pilot resource elements is based at least in part on the indicated configuration of the set of pilot resource elements;
decoding a second subset of the set of pilot resource elements based at least in part on a first subset of the set of pilot resource elements to determine the demodulation reference signal that is associated with the set of data resource elements; and
performing a digital post distortion procedure for the received set of data resource elements based at least in part on the determined demodulation reference signal.

22. The method of claim 21, wherein each pilot resource element of the set of pilot resource elements is modulated according to a quadrature phase shift keying.

23. The method of claim 21, further comprising:
identifying the first subset of the set of pilot resource elements that excludes the second subset of the set of pilot resource elements, wherein decoding the second subset of the set of pilot resource elements is based at least in part on identifying the first subset of the set of pilot resource elements.

24. The method of claim 21, wherein receiving the set of pilot resource elements is based at least in part on the set of pilot resource elements being associated with a metric that satisfies a threshold.

25. The method of claim 24, wherein
the metric comprises a percentile peak value and the metric satisfying the threshold comprises the percentile peak value being above the threshold.

26. An apparatus for wireless communication at a first wireless device, comprising:
- a processor;
- memory coupled with the processor; and
- instructions stored in the memory and executable by the processor to cause the apparatus to:
  - identify a set of data resource elements for transmitting data in one or more symbol periods;
  - select, for the one or more symbol periods based at least in part on the set of data resource elements, a sequence of a set of pilot resource elements associated with the set of data resource elements from a set of sequences, the sequence of the set of pilot resource elements comprising a demodulation reference signal; and
  - transmit, to a second wireless device in the one or more symbol periods, the set of data resource elements and the set of pilot resource elements associated with the set of data resource elements, wherein transmitting the set of pilot resource elements is based at least in part on selecting the sequence from the set of sequences.

27. The apparatus of claim 26, wherein the instructions are further executable by the processor to cause the apparatus to:
  - transmit, to the second wireless device, an indication of a first subset of the set of pilot resource elements, wherein the first subset of the set of pilot resource elements excludes at least one pilot resource element of the set of pilot resource elements, and wherein transmitting the set of pilot resource elements is based at least in part on transmitting the indication of the first subset of the set of pilot resource elements.

28. The apparatus of claim 27, wherein the instructions to transmit the indication of the first subset of the set of pilot resource elements are executable by the processor to cause the apparatus to:
  - transmit configuration signaling identifying the first subset of the set of pilot resource elements.

\* \* \* \* \*